United States Patent [19]

Kodama et al.

[11] Patent Number: 4,985,789
[45] Date of Patent: Jan. 15, 1991

[54] SIGNAL RECORDING-REPRODUCING APPARATUS FOR USE WITH CASSETTE

[75] Inventors: Yoshimi Kodama, Kobe; Takefumi Tsuchida, Toyonaka, both of Japan

[73] Assignee: Sanyo Electric Co., Ltd., Osaka, Japan

[21] Appl. No.: 250,274

[22] Filed: Sep. 28, 1988

[30] Foreign Application Priority Data

| Oct. 2, 1987 | [JP] | Japan | 62-250200 |
| Jan. 20, 1988 | [JP] | Japan | 63-11518 |
| Feb. 10, 1988 | [JP] | Japan | 63-29376 |
| Feb. 10, 1988 | [JP] | Japan | 63-29377 |
| Feb. 19, 1988 | [JP] | Japan | 63-38289 |
| Apr. 20, 1988 | [JP] | Japan | 63-96998 |

[51] Int. Cl.$^5$ .................. G11B 5/027; G11B 5/008
[52] U.S. Cl. ............................. 360/85; 360/95
[58] Field of Search ........................ 360/84, 85, 95

[56] References Cited

U.S. PATENT DOCUMENTS

| 3,154,956 | 11/1964 | Eash | 74/107 |
| 3,838,465 | 9/1974 | Fischer et al. | 360/137 |
| 4,757,397 | 7/1988 | Zaitsu et al. | 360/85 |
| 4,789,912 | 12/1988 | Masuda et al. | 360/95 X |
| 4,796,115 | 1/1989 | Ohshima et al. | 360/85 |
| 4,803,574 | 2/1989 | Konishi et al. | 360/85 |

FOREIGN PATENT DOCUMENTS

| 0189937 | 1/1986 | European Pat. Off. . |
| 0203783 | 5/1986 | European Pat. Off. . |
| 0232161A | 2/1987 | European Pat. Off. . |
| 3701159A | 1/1987 | Fed. Rep. of Germany . |
| 57-69565 | 4/1982 | Japan . |
| 59-52451 | 3/1984 | Japan . |
| WO84/03790 | 9/1984 | PCT Int'l Appl. . |

Primary Examiner—John H. Wolff
Attorney, Agent, or Firm—Armstrong, Nikaido, Marmelstein, Kubovcik & Murray

[57] ABSTRACT

A signal recording-reproducing apparatus for use with a cassette includes a reel chassis slidably provided on a main chassis and stoppable at least at three positions, i.e., a standby mode position where the reel chassis is to be loaded with the cassette, a play mode position closer to the cylinder device of the apparatus than the standby mode position, and an empty mode position closer to the cylinder device than the play mode position. In the empty mode, the reel chassis is not loaded with a cassette, and the apparatus has a minimum depthwise length compared to the other modes.

15 Claims, 25 Drawing Sheets

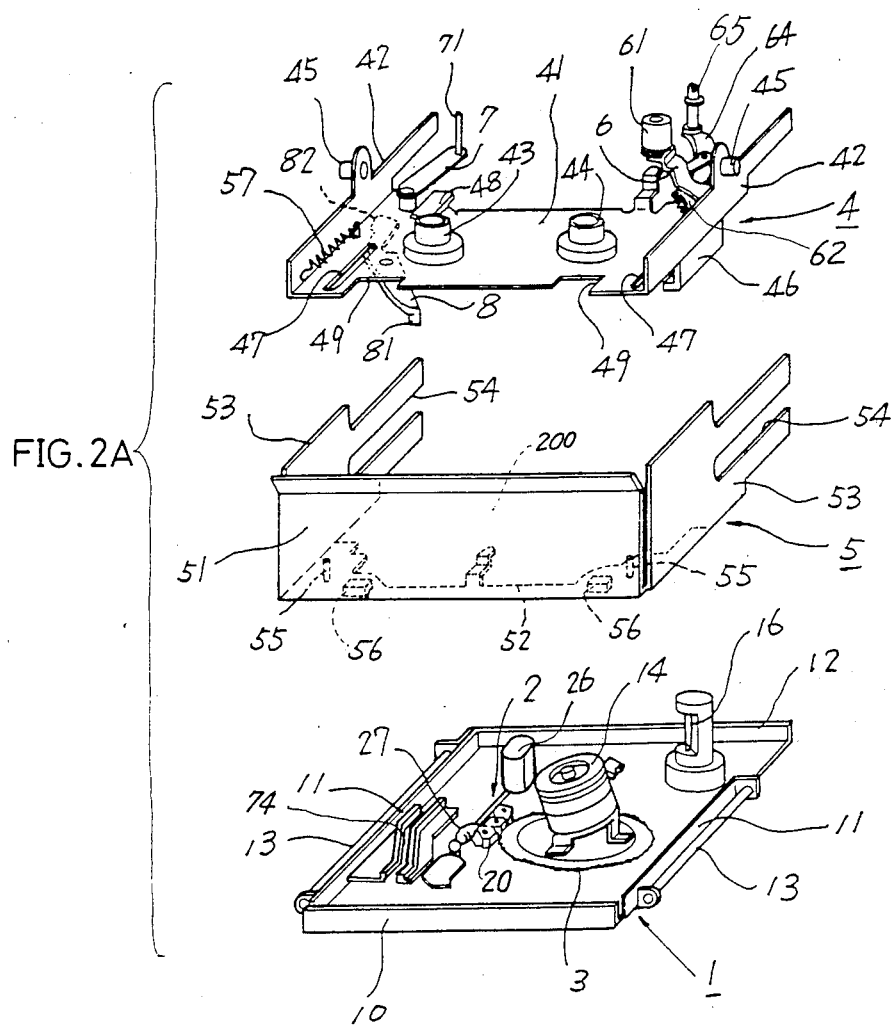

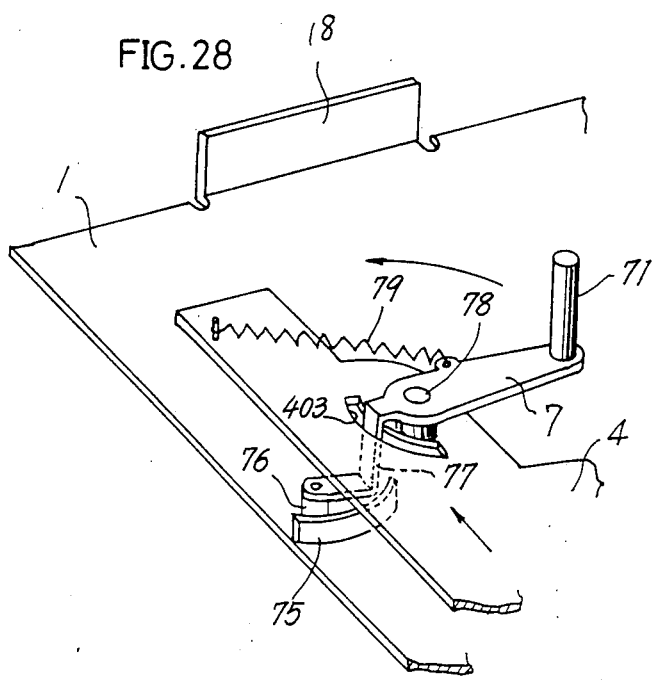
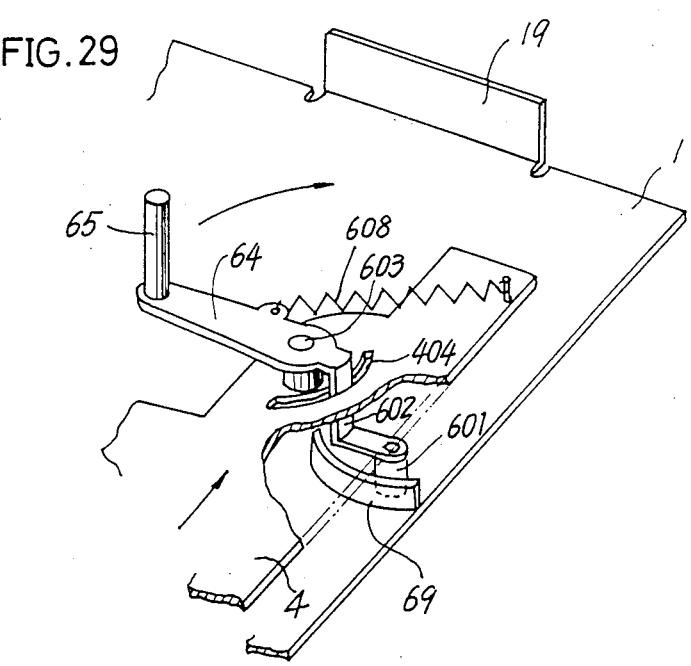

SIGNAL RECORDING-REPRODUCING APPARATUS FOR USE WITH CASSETTE

FIELD OF THE INVENTION

The present invention relates to apparatus for recording signals on a magnetic tape in a cassette or reproducing signals from the magnetic tape, and more particularly to signal recording-reproducing apparatus which are variable in depthwise length and convenient to carry.

BACKGROUND OF THE INVENTION

In recent years, video tape recorders (VTRs) are made available in reduced sizes. Especially, subminiature lightweight VTRs have been realized for use with a magnetic tape having a width of 8 mm.

With a reduction in the size and weight of VTRs, a camera-equipped VTR has been realized which comprises a VTR unit and a camera unit attached thereto. It is also possible to provide a liquid-crystal color television and a VTR in the form of an assembly to realize a portable image reproduction system. Stringent requirements are made of such VTRs for further miniaturization.

A VTR has been proposed which is variable in depthwise length along the direction of insertion of the cassette according to the mode of its operation as seen in FIGS. 39A and 39B (Unexamined Japanese Patent Publication SHO 61-271648).

With the proposed VTR, a cylinder device 14 having a rotary magnetic head is mounted on a main chassis 1, and a reel chassis 4 provided on the main chassis 1 is slidable toward or away from the cylinder device 14. A supply reel support 43 and a take-up reel support 44 are mounted on the reel chassis 4.

In the mode (standby mode) illustrated in FIG. 39A, the reel chassis 4 is partly projected from the main chassis 1 as indicated at A. A tape cassette 9 is placed on the reel supports 43, 44 on the reel chassis 4 in this state.

In the mode (play mode) shown in FIG. 39B, the reel chassis 4 is positioned as slidingly shifted toward the cylinder device 14, with the cylinder device 14 partly inserted in the front opening 91 of the cassette 9. In this state, the magnetic tape is passed around the cylinder device to record signals on the tape or reproduce signals therefrom.

The VTR is convenient to carry since the depthwise length can be reduced from $L_1$ to $L_2$ as illustrated.

With the VTR, however, the minimum depthwise length $L_2$ is limited by the size of the cassette, imposing a limitation on the miniaturization of the apparatus. For example, when the cylinder device 14 for an 8-mm VTR is 27 mm in outside diameter, the minimum depthwise length $L_2$ is virtually limited to about 85 mm. Furthermore, standards or specifications are set for 8-mm VTRs in respect of the cassette size and the outside diameter of the cylinder device 14. Accordingly, difficulties are encountered in subminiaturizing the VTR.

Unexamined Japanese Patent Publication SHO 62-164249 discloses a VTR wherein the cylinder device 14 can be almost completely accommodated in the opening 91 of a cassette 9 in the play mode in order to reduce the depthwise length in this mode. The apparatus is so adapted by accommodating in the cassette 9 a magnetic tape having a shorter length than the standard to reduce the diameter of the reels therein and to correspondingly enlarge the opening 91. The VTR therefore has the drawback of being unusable for the standard cassette.

SUMMARY OF THE INVENTION

An object of the present invention is to provide a signal recording-reproducing apparatus which can be made smaller in size than conventionally possible when carried even if there are limitations to the size and shape of the cassette to be used therewith and to the outside diameter of the cylinder device.

Since it is required that the cassette be loaded in the apparatus for recording or reproduction, the minimum depthwise length of the apparatus is invariably limited by the width of the cassette, while the minimum depthwise length of the apparatus remains unchanged regardless of whether or not the cassette is loaded in the apparatus. Directing attention to this point, we have achieved the above object by making the reel chassis positionable closer to the cylinder device when the apparatus is not loaded with the cassette than when it is loaded therewith.

Another object of the invention is to provide a signal recording-reproduction apparatus for use with cassettes wherein the tape loading device for withdrawing the magnetic tape from the cassette and winding the tape around the cylinder device, or the pinch roller pressing mechanism for driving the magnetic tape as withdrawn from the cassette is made movable with the shift of the reel chassis.

Another object of the invention is to provide a VTR which is equipped with a camera unit integrally therewith and wherein when the reel chassis is positioned as projected from the main chassis in the play mode, various drive means on the reel chassis so projected can be covered with a component of the camera unit for protection.

Another object of the invention is to provide a signal recording-reproducing apparatus wherein an operation panel on the main chassis is openable and closable by the movement of a cover secured to the reel chassis so that the operation panel can be opened only when required.

The signal recording-reproducing apparatus of the present invention for use with cassettes comprises a reel chassis which can be stopped at least at three positions, i.e. a first stop position $S_1$ of a standby mode where the cassette is to be set, a second stop position $S_2$ of a play mode where a cassette is closer to the cylinder device than the first stop position $S_1$, and a third stop position $S_3$ of an empty mode (mode wherein the cassette is not loaded) where the cassette is still closer to the cylinder device than the second stop position $S_2$.

In the standby mode, the reel chassis is held in the first stop position $S_1$ as projected from the main chassis. The reel chassis is retractable toward the cylinder device from this position.

The reel chassis, when loaded with the cassette, stops at the second stop position $S_2$ for operation in the play mode, i.e. for recording or reproduction.

When not loaded with the cassette and empty, the reel chassis is further retracted and stopped at the third stop position $S_3$ for the empty mode.

In the empty mode, the depthwise length of the apparatus is not limited by the width of the cassette and can therefore be smaller than the minimum depthwise length of conventional apparatus.

BRIEF DESCRIPTION OF THE DRAWINGS

FIG. 2A is an exploded perspective view of a chassis structure;

FIG. 28 is a perspective view of a supply side tape withdrawing lever included in the fourth embodiment;

FIG. 29 is a perspective view of a take-up side tape withdrawing lever included in the fourth embodiment;

DETAILED DESCRIPTION OF THE INVENTION

The present invention will be described below in detail with reference to several embodiments of 8-mm VTRs.

(First Embodiment)

Overall Construction

The VTR illustrated has four different modes, i.e. empty mode, play mode, standby mode and ejection mode. The mode changes according to the position where a reel chassis 4 stops and to the state of a cassette holder 15 as seen in FIGS. 1A, 1B, 1C and 1D.

Figure 1A:
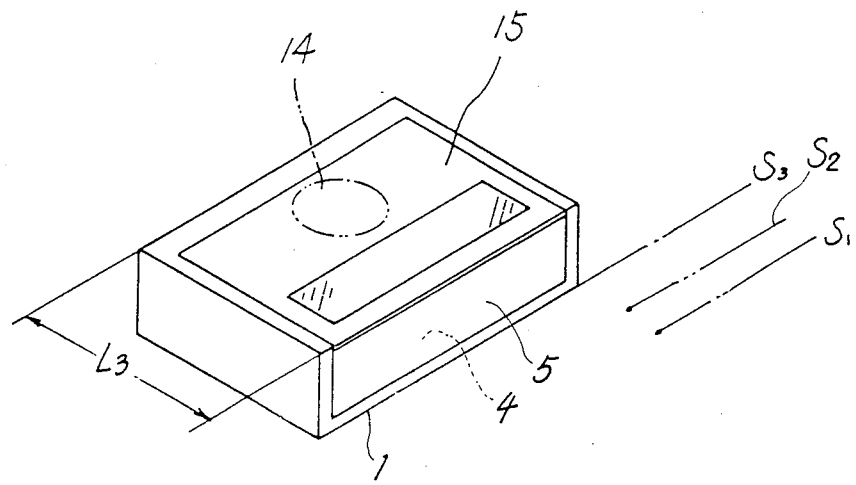
FIG. 1A is a perspective view showing the appearance of VTR in an empty mode.
Figure 1B:
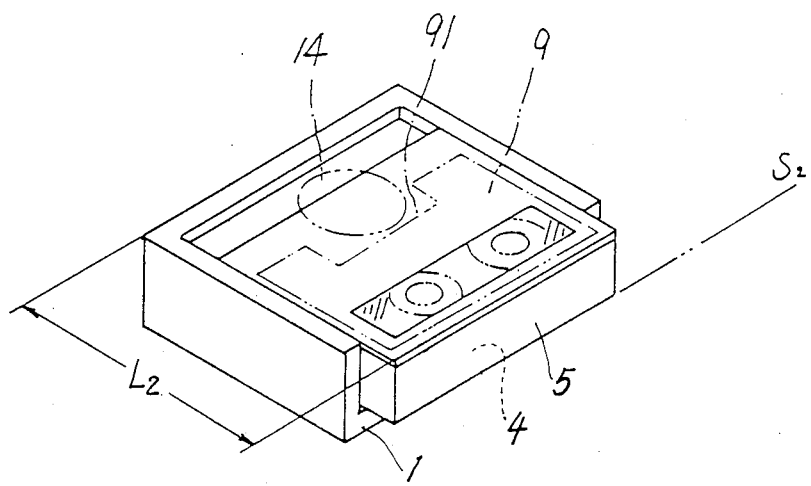
FIG. 1B is a perspective view of the same in a play mode.
Figure 1C:
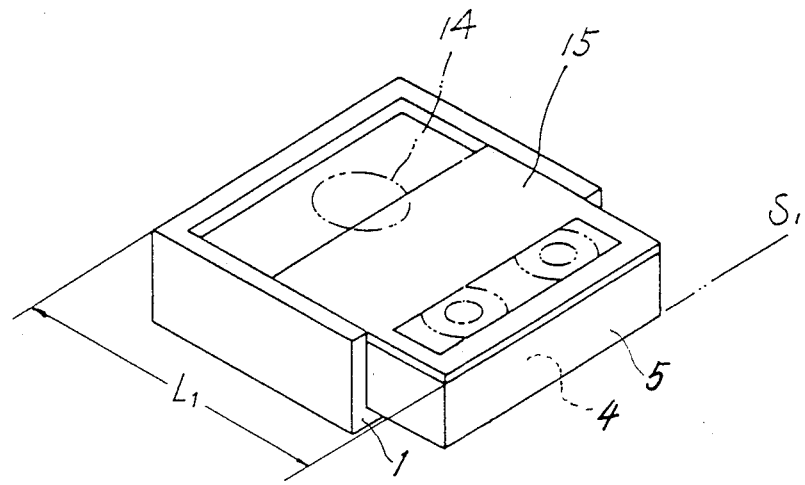
FIG. 1C is a perspective view of the same in a standby mode.
Figure 1D:
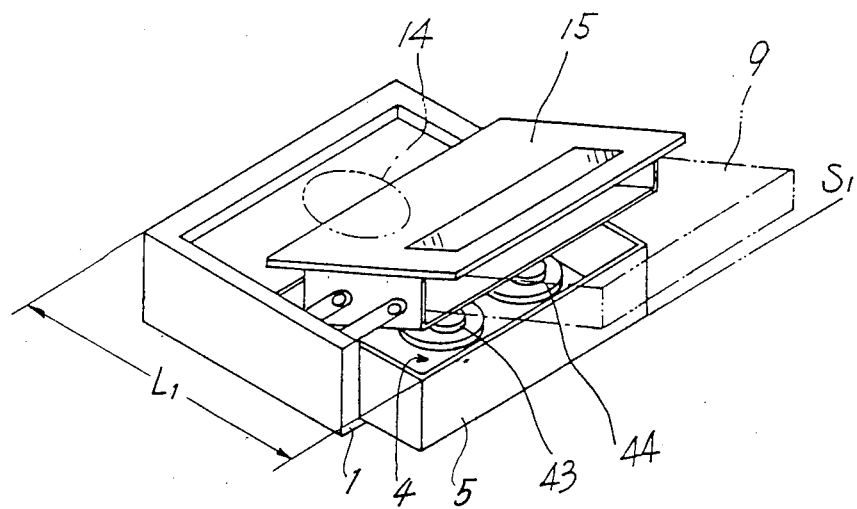
FIG. 1D is a perspective view of the same in an ejection mode.

In the ejection mode shown in FIG. 1D, the reel chassis 4 is at a stop in a first stop position $S_1$ as projected to the greatest extent from a main chassis 1, and the cassette holder 15 for accommodating a tape cassette 9 is in a raised position.

In the standby mode shown in FIG. 1C, the cassette holder 15 as lowered is held locked to the reel chassis 4.

In the play mode shown in FIG. 1B, the reel chassis 4 has been moved from the position of the standby mode toward a cylinder device 14 and is at rest in a second stop position $S_2$. In the play mode, the apparatus operates for signal recording or reproduction.

In the empty mode shown in FIG. 1A, the reel chassis 4 has been moved further toward the cylinder device 14 and is at rest in a third stop position $S_3$ closer to the device than the position $S_2$ of the play mode, with the holder 15 emptied of the cassette. In the empty mode, the VTR has a minimum depthwise length in its entirety.

Figure 3:
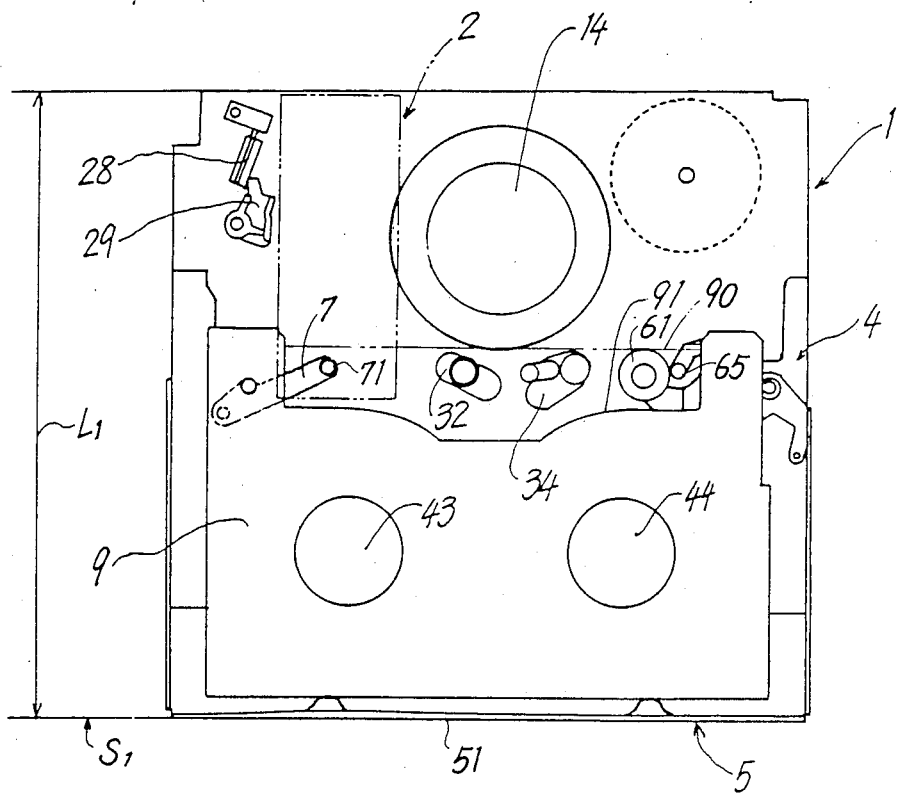
FIG. 3 is a plan view showing the interior of the VTR loaded with a cassette in the standby mode.
Figure 4:
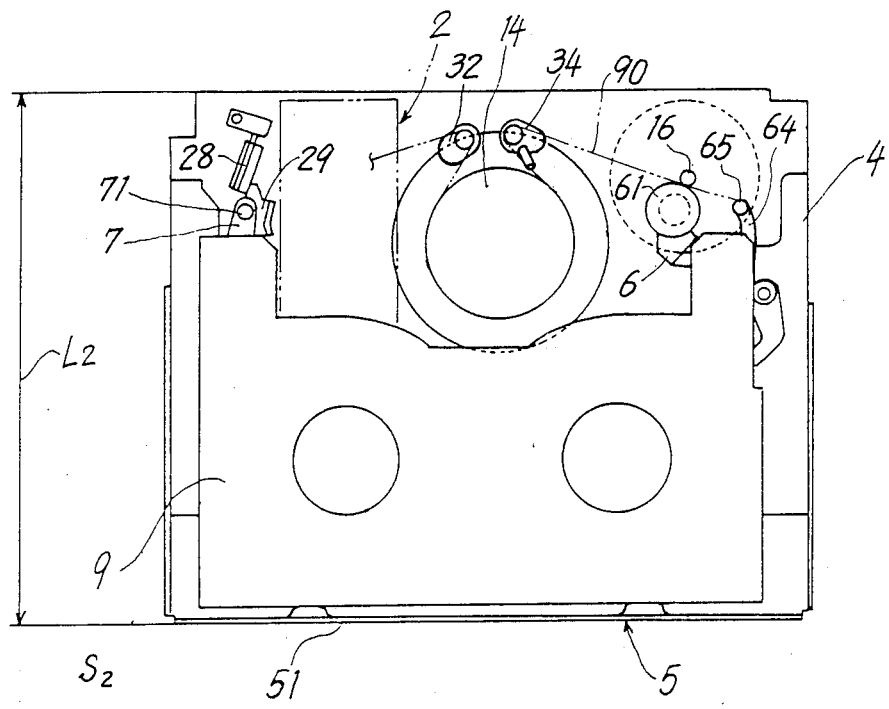
FIG. 4 is a plan view showing the same in the play mode.
Figure 5:
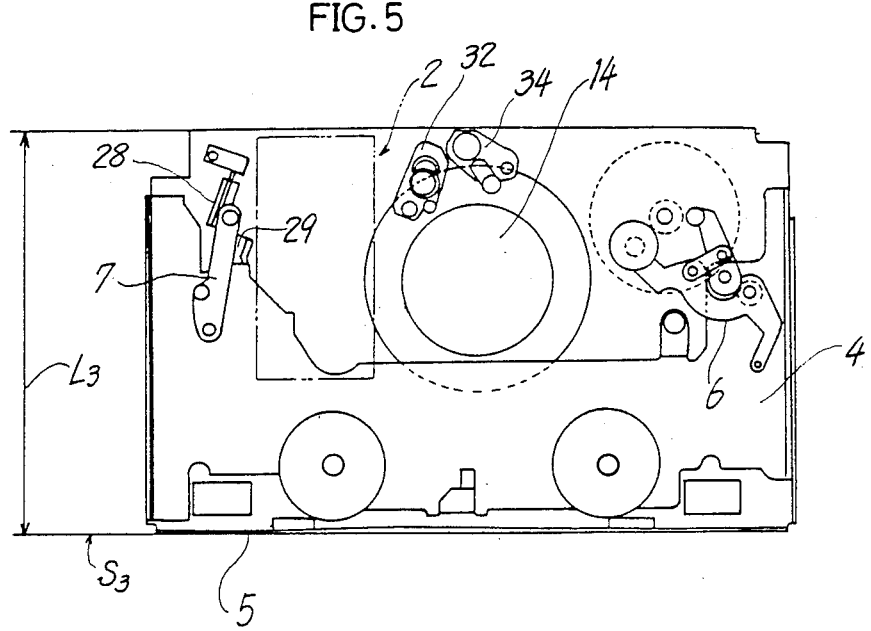
FIG. 5 is a plan view showing the interior of the VTR in the empty mode.

The VTR has a depthwise length $L_1$ of 103 mm in the standby mode shown in FIGS. 1C and 3, a depthwise length $L_2$ of 87 mm in the play mode shown in FIGS. 1B and 4, and a depthwise length $L_3$ of 67 mm in the empty mode shown in FIGS. 1A and 5. In depthwise length, the VTR is 16 mm smaller in the play mode of FIG. 1B than in the standby mode and 36 mm smaller in the empty mode than in the standby mode.

With reference to FIG. 2A, the VTR has a chassis structure carrying thereon the mechanisms to be described later. The chassis structure comprises the main chassis 1 which is rectangular, the above-mentioned reel chassis 4 slidably mounted on the main chassis 1, and a subchassis 5 slidably provided between the two chassis 1, 4.

The main chassis 1 has mounted thereon the cylinder device 14, a tape loading device 2 in the vicinity of the device 14, and a capstan 16 at the right side of the device 14 inwardly thereof.

Tape Loading Device

Figure 11:
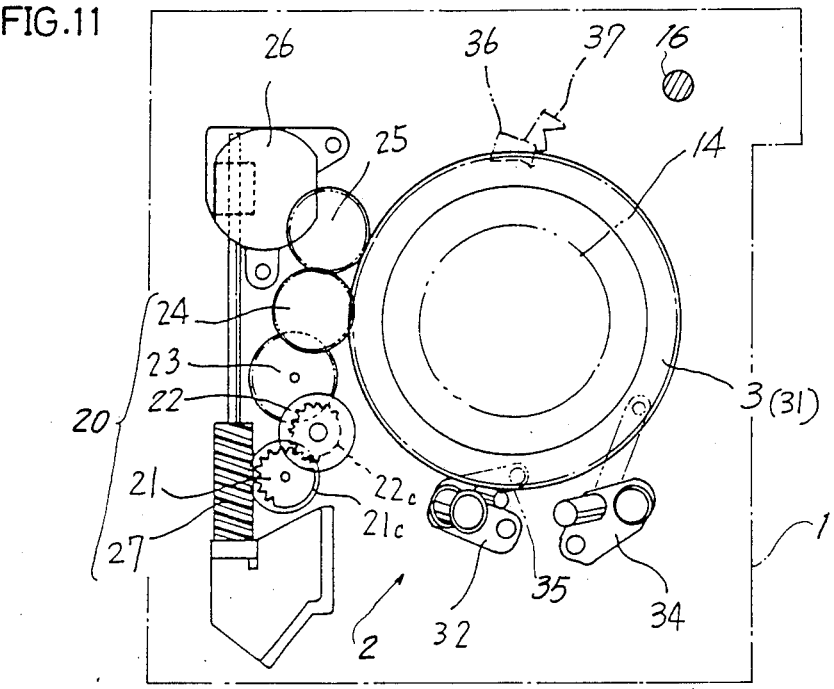
FIG. 11 is a plan view showing a tape loading device as initiated into loading operation.
Figure 12:
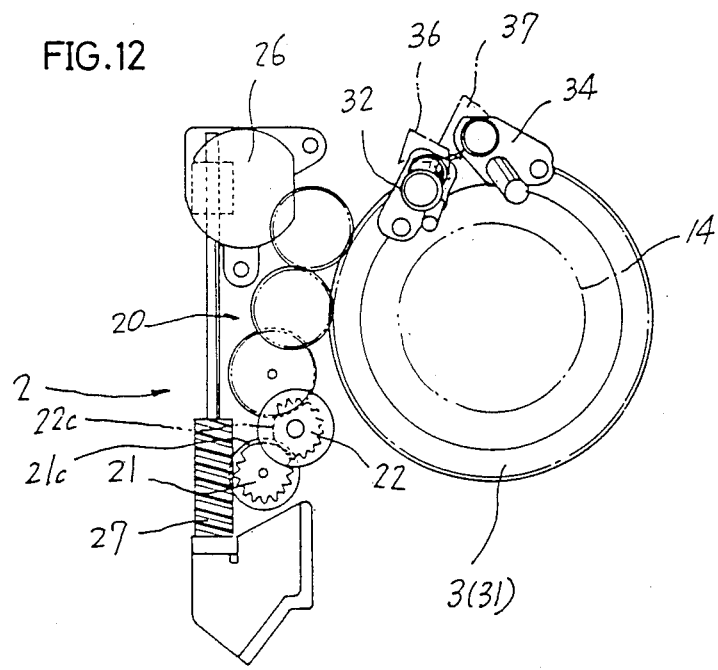
FIG. 12 is a plan view showing the same on completion of the loading operation.
Figure 13:
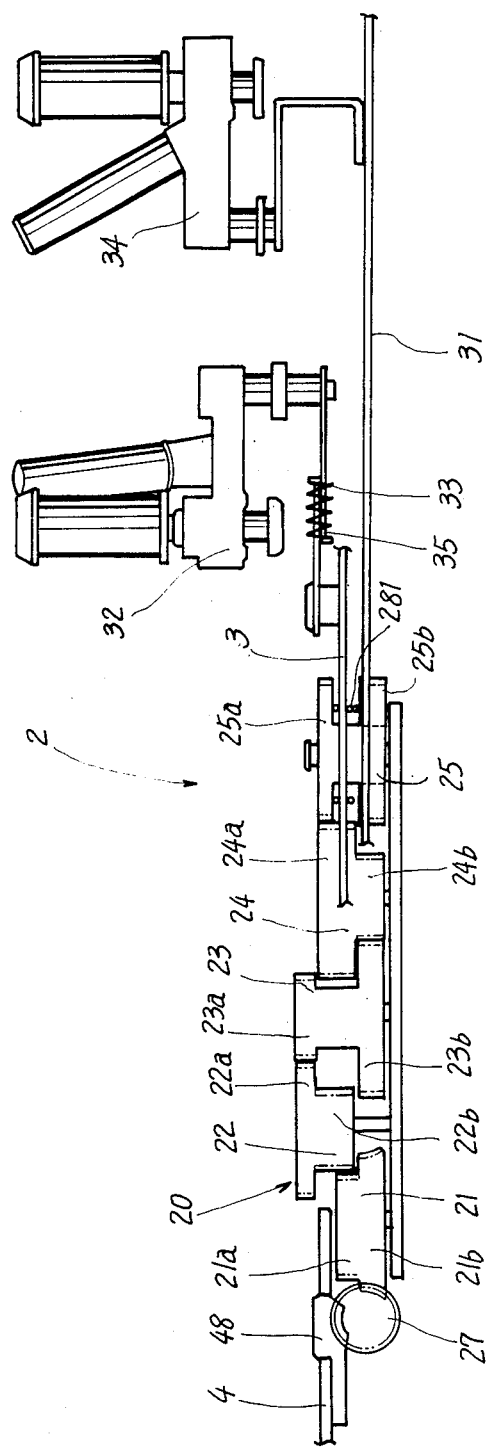
FIG. 13 is a view in section taken along a train of gears of the tape loading device.

With reference to FIGS. 11, 12 and 13, the tape loading device 2 comprises two concentric annular gears 3, 31 rotatably disposed one above the other and surrounding the lower portion of the cylinder device 14. The upper gear 3 is provided with a tape guide 32 for the tape supply side, and the lower gear 31 with a tape guide 34 for the tape take-up side.

The tape guide 32 on the supply side is attached to the annular gear 3 by a lever 35. Provided between the lever 35 and the guide 32 is a spring 33 for bringing the guide 32 into pressing contact with a positioning stopper 36 on the main chassis 1 when the tape has been completely loaded.

The annular gears 3, 31 are coupled to a loading motor 26 by an intermediate gear train 20, which comprises a worm 27 drivingly rotatable by the motor 26, and first, second, third, fourth and fifth gears 21, 22, 23, 24 and 25 which are disposed between the worm 27 and the gears 3, 31.

As seen in FIG. 13, each of the first to fifth gears has upper and lower two gear portions. The lower gear portion 21b of the first gear 21 is a worm wheel in mesh with the worm 27, and the upper gear portion 21a thereof meshes with the lower gear portion 22b of the second gear 22.

The upper gear portion 22a of the second gear 22 is in mesh with the upper gear portion 23a of the third gear 23, and the lower gear portion 23b of the third gear 23 with the lower gear portion 24b of the fourth gear 24. The upper gear portion 24a of the fourth gear 24 is in mesh with the upper gear portion 25a of the fifth gear 25 and with the upper annular gear 3. The lower gear portion 25b of the fifth gear 25 is in mesh with the lower annular gear 31.

The upper and lower gear portions of each of the first to fourth gears 21 to 24 are rotatable together, whereas the upper gear portion 25a of the fifth gear 25 and the lower gear portion 25b thereof are concentrically supported by a shaft to rotate independently of each other and are connected together by a torsion spring 281 (see FIG. 13).

With reference to FIG. 11, the upper gear portion 21a of the first gear 21 and the lower gear portion 22b of the second gear 22 are each toothed along a portion of the periphery. The upper gear portion 21a is partly formed with a large circular-arc portion 21c having the radius of its addendum circle. The lower gear portion 22b partly has a small circular-arc portion 22c having the radius of its addendum circle.

When the first gear 21 rotates clockwise in the standby mode of FIG. 11, the upper annular gear 3 is rotated through the intermediate gear train 20 to revolve the supply tape guide 32 clockwise. On the other hand, the lower annular gear 31 is rotated counterclockwise to revolve the take-up tape guide 34 counterclockwise. Consequently, the tape guides 32, 34 come into contact with the stopper 36 and a stopper 37, respectively, which are provided on the main chassis, whereby the guides are positioned in place for the completion of tape loading.

At this time, the upper gear portion 25a of the fifth gear 25 overruns, causing the torsion spring 281 to bias the lower gear portion 25b into rotation and thereby pressing the guide 34 into contact with the positioning stopper 37.

Even when the first gear 21 further rotates clockwise from the above state, the large circular-arc portion 21c of the upper gear portion 21a of the first gear 21 is opposed to the small circular-arc portion 22c of the gear portion 22b of the second gear 22, so that the first gear 21 idly rotates without transmitting its torque to the second gear 22 and the subsequent gears.

In the play mode of FIG. 12, the reaction of the spring 33 pressing the supply tape guide 32 against the stopper 36 and the reaction of the torsion spring 281 pressing the take-up tape guide 34 against the stopper 37 subject the respective annular gears 3, 31 to a force acting in the unloading direction, whereby the second gear 22 is subjected to a clockwise torque.

Nevertheless, with the large circular-arc portion 21c of the first gear 21 opposed to the second gear 22 as stated above, the tooth of the lower gear portion 22b of the second gear 22 bears against the circular-arc portion 21c to prevent the clockwise rotation of the second gear 22.

When unloading the tape, the loading motor 26 rotates reversely, rotating the first gear 21 counterclockwise and meshing the upper gear portion 21a of the first gear 21 with the lower gear portion 22b of the second gear 22 again. At this time, the first gear 21 is smoothly meshable with the second gear 22 since the gear 22 is subjected to the above-mentioned clockwise torque. As a result, the annular gears 3, 31 reversely rotate to return the tape guides 32, 34 to the original position shown in FIG. 11.

With the tape loading device 2, it is important that even after the tape has been loaded in place, the worm 27 can be driven by the loading motor within the range of contact of the circular-arc portion 21c of the first gear 21 with the circular-arc portion 22c of the second gear 22 opposed thereto, with the tape guides 32, 34 held by the stoppers 36, 37 in the loading completed position. Consequently, the rotation of the worm 27 can be transmitted to the mechanism for driving the reel chassis 4 to slide the chassis 4 to the third stop position as will be described below.

Chassis Structure

Figure 2B:
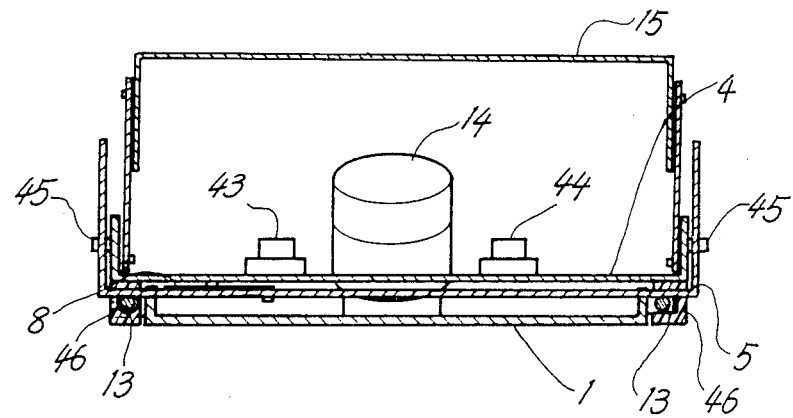
FIG. 2B is a cross sectional view of the same as assembled.

With reference to FIGS. 2A and 2B, the main chassis 1 has upwardly bent walls of short height at its four sides, including opposed side walls 11, 11 each having a guide bar 13.

The reel chassis 4 is provided on the main chassis 1 and is movable toward or away from the cylinder device 14. The reel chassis 4 has a bottom plate 41 which is bent upward at its opposite sides to form side plates 42, 42. Guide members 46 projecting downward from the respective sides of the bottom plate 41 are slidably in engagement with the guide bars 13, 13 on the main chassis 1.

A supply reel support 43 and a take-up reel support 44 are mounted on the bottom plate 41 of the reel chassis 4. The bottom plate 41 further carries a subchassis drive lever 8, pinch roller lever 6, tape withdrawing lever 64 on the take-up side and tape withdrawing lever 7 on the supply side, each pivotally movably in a plane parallel to the bottom plate 41.

The bottom plate 41 is greatly cut out at its one side closer to the cylinder device 14. When the reel chassis 4 retracts toward the cylinder device 14, lapping over the main chassis 1, the cylinder device 14 is positioned in the cutout of the chassis 4 without the likelihood of the chassis 4 striking against the device 14.

As shown in FIG. 2A and 13, the bottom plate 41 is provided on its lower side with a rack plate 48 having a toothed lower surface and meshing with the worm 27 of the tape loading device 2. The worm 27, when rotated, moves the reel chassis 4 toward or away from the cylinder device 14.

With reference to FIG. 2A, the subchassis 5 provided between the main chassis 1 and the reel chassis 4 comprises a front plate 51, a pair of side plates 53 and a bottom plate 52 joined to the front plate 51 and to the side plates 53. The bottom plate 52 is greatly cut out except at its opposite end portions.

Provided on the bottom plate 52 is an unlocking piece 200 movable into the cassette on the reel chassis 4 through a hole in the bottom of the cassette for releasing the reel locking mechanism within the cassette.

Each side plate 53 of the subchassis 5 is formed with a guide groove 54 having rollably fitted therein a roller 45 mounted on the side plate 42 of the reel chassis 4. The subchassis 5 has a pair of guide pins 55 projecting from its bottom plate 52 and each slidably fitted in a guide slit 47 formed in the bottom plate 41 of the reel chassis 4. Accordingly, the subchassis 5 is slidable in the same direction as the reel chassis 4 independently of the sliding movement of the reel chassis 4.

The subchassis 5 has on the upper surface of its bottom plate 52 a pair of cassette sensor switches 56, 56 projecting upward above the reel chassis 4 through front cutouts 49 formed in the chassis bottom plate 41.

A spring 57 for biasing the subchassis 5 toward the cylinder device 14 is connected between the subchassis 5 and the reel chassis 4. The movement of the subchassis 5 is limited by the spring 57 and the subchassis drive lever 8 pivoted to the bottom side of the reel chassis 4.

The drive lever 8 has a downward contact lug 81 at its one end and a contact pawl 82 at the other end thereof. In the ejection mode of FIG. 6, the contact lug 81 bears against the inner surface of the front wall 10 of the main chassis 1, while the contact pawl 82 bears on the rear end face of the bottom plate 52 of the subchassis 5. In FIGS. 6 to 10, the main chassis 1 and the subchassis 4 are shown only partly by two-dot-and-dash lines.

The subchassis 5 is biased toward the cylinder device 14 by the spring 57 at all times as already stated, exerting a clockwise torque on the drive lever 8, whereas the lever 8 is prevented from clockwise rotation by the engagement of the contact lug 81 with the inner surface of the front wall 10 of the main chassis 1. In the ejection mode of FIG. 6, accordingly, the subchassis 5 is held projected from the main chassis 1 to the greatest extent and thus fixedly positioned relative to the main chassis 1.

Figure 6:
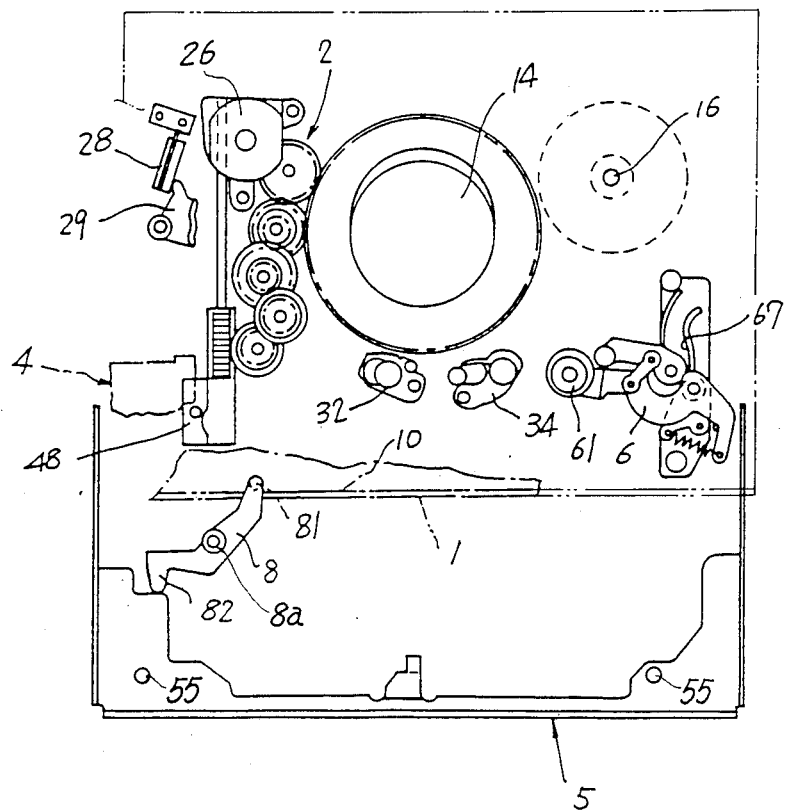
FIG. 6 is a plan view showing a subchassis as positioned in the standby mode with no cassette loaded in the VTR.
Figure 7:
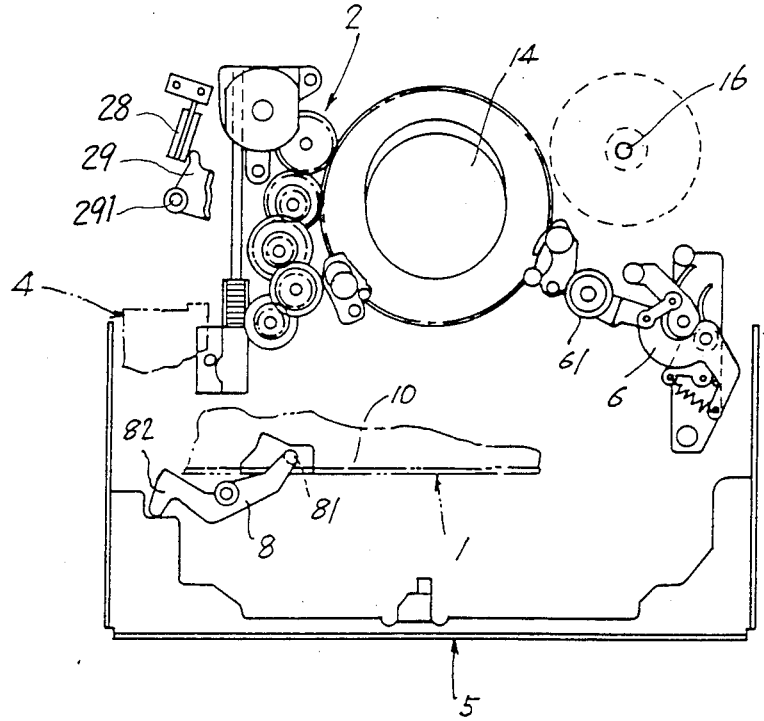
FIG. 7 is a plan view showing the same in the initial stage of change from the standby mode to the play mode.
Figure 8:
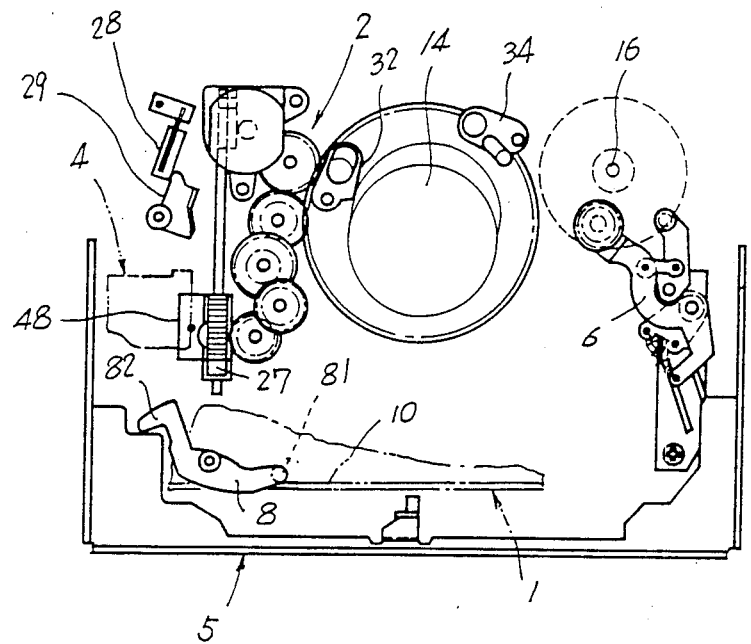
FIG. 8 is a plan view of the same in the final stage of change from the standby mode to the play mode.

As seen in FIG. 6, a mode sensor switch 28 for controlling the loading motor 26 is disposed close to the motor 26 on the main chassis 1. A switch lever 29 for actuating the switch is movably supported by a pivot 291.

Upon the reel chassis 4 reaching the second stop position $S_2$ of the play mode with the cassette on the reel chassis 4, the wall of the cassette 9 comes into contact with the switch lever 29, thereby closing the switch 28 to stop the loading motor 26.

On the other hand, when the reel chassis 4 carries no cassette and is empty, the reel chassis 4 further advances and reaches the third stop position $S_3$ of the empty mode, whereupon the reel chassis 4 contacts the switch lever 29 as seen in FIG. 5 to thereby close the switch 28 and stop the loading motor 26.

Pinch Roller Pressing Mechanism

Figure 14:
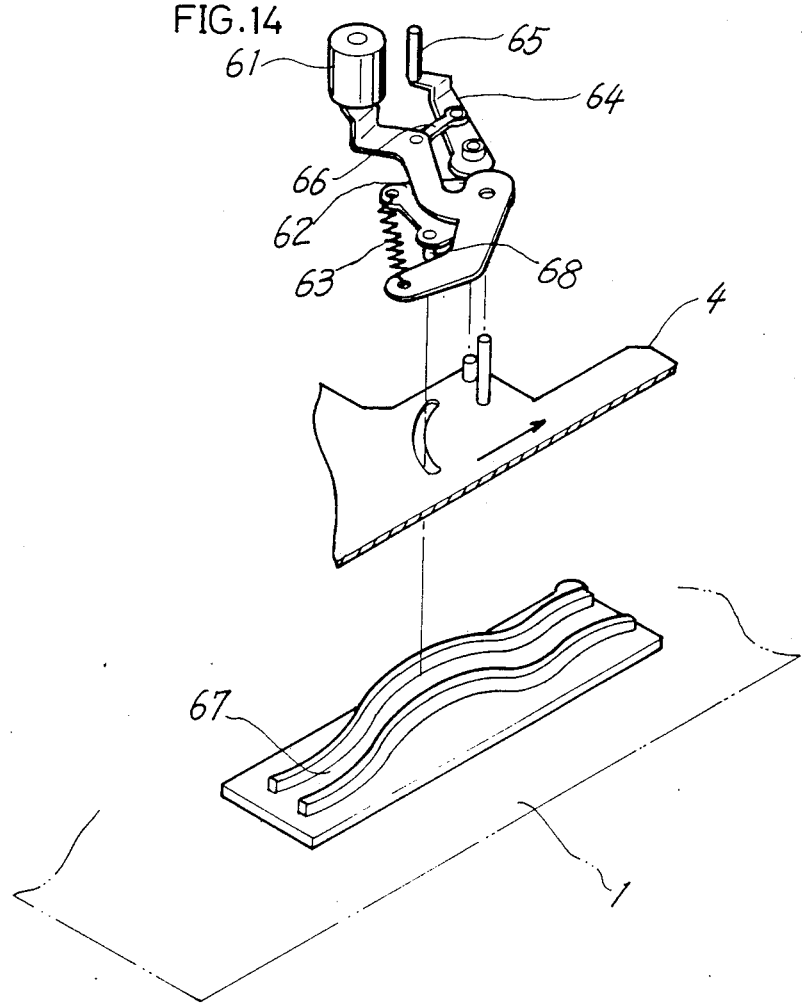
FIG. 14 is a perspective view of a pinch roller pressing mechanism.

With reference to FIGS. 2A and 14, the bottom plate 41 of the reel chassis 4 is provided on the right side thereof with the pinch roller lever 6 and a drive lever 62 supported by a pivot and rotatable independently of each other. A spring 63 is connected between the drive lever 62 and the pinch roller lever 6.

The pinch roller lever 6 has a free end close to the cylinder device and carrying a pinch roller 61 in an upwardly projecting state. The drive lever 62 has a free end with a cam roller 68 downwardly projecting therefrom. The cam roller 68 is rollably engaged in a cam groove 67 formed on the main chassis 1 to provide a cam follower.

The tape withdrawing lever 64 on the take-up side, which is pivoted to the reel chassis 4, is connected to the pinch roller lever 6 by a link plate 66. The lever 64 has a free end carrying a pin 65 for engaging the magnetic tape within the cassette.

The cam groove 67 on the main chassis is so shaped as to rotate the drive lever 62 clockwise with the movement of the reel chassis 4 from the position of FIG. 1C to the position of FIG. 1B and further to rotate the drive lever 62 counterclockwise with the movement of the reel chassis 4 from the position of FIG. 1B to the position of FIG. 1A, whereby the pinch roller lever 6 is rotated counterclockwise to move the pinch roller 61 slightly away from the capstan 16.

Figure 15:
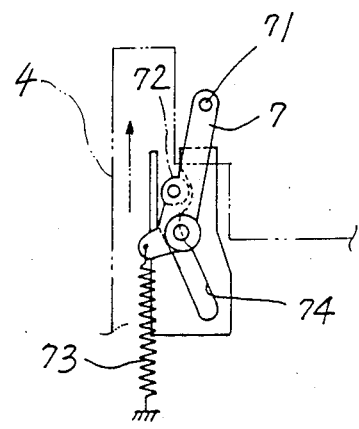
FIG. 15 is a plan view showing a tape withdrawing lever at the supply side.

As seen in FIG. 2A and 15, the tape withdrawing lever 7 for the supply side is provided on a left portion of the bottom plate 41 of the reel chassis 4. The lever 7 is biased counterclockwise by a spring 73 and has a downwardly projecting cam roller 72 in the vicinity of the center of its rotation, The roller 72 is slidably fitted in a cam groove 74 formed on the main chassis 1 to serve as a cam follower.

The lever 7 has a free end carrying a pin 71 for engaging the magnetic tape in the cassette.

The operation of the VTR will be described below in the case where the reel chassis 4 is loaded with the cassette 9 and also when it is loaded with no cassette.

With Cassette Loaded

In the ejection mode of FIG. 1D, the cassette 9 is placed into the holder 15, which is then lowered onto the reel chassis 4, whereby the holder 15 is locked to the chassis 4 by unillustrated lock means. At the same time, the cassette sensor switches 56 shown in FIG. 2A function, initiating the loading motor 26 into operation.

The tape loading device 2 therefore operates, causing the tape guides 32, 34 to revolve around the cylinder device 14 approximately one-half of the circumference while withdrawing a magnetic tape 90 from the cassette 9 to load the tape in place as seen in FIGS. 3 and 4.

Simultaneously with the loading operation, the reel chassis 4 is driven toward the cylinder device 14 to the second stop position of play mode shown in FIG. 4. Consequently, the cassette 9 strikes on the switch lever 29 to stop the loading motor. The reel chassis 4 also stops. The reel chassis 4 is thus moved by an amount of 16 mm.

During the retraction of the reel chassis 4 in the direction of arrow shown in FIG. 14, the cam roller 68 is driven along the cam groove 67 to move the drive lever 62 on the reel chassis clockwise in conformity with the configuration of the cam groove 67, thereby moving the pinch roller lever 6 in the same direction through the spring 63.

The movement of the pinch roller lever 6 causes the link plate 66 to rotate the tape withdrawing lever 64 also clockwise for the lever 64 to withdraw the tape from the cassette. At the same time, the pinch roller 61 on the lever 6 presses the magnetic tape 90 against the capstan 16.

The tape withdrawing lever 64 has a pivot located away from the pivot for the pinch roller lever 6. Therefore, in the state shown in FIG. 3, the pin 65 is positioned in the vicinity of the pinch roller 61 and housed conveniently in the cassette. However, as the reel chassis 4 moves toward the position shown in FIG. 4, the distance between the pin 65 and the pinch roller 61 becomes larger gradually. When the reel chassis 4 arrives at the play mode position shown in FIG. 4, the pinch roller lever 6 arrives at the position where the pinch roller 61 presses the magnetic tape 90 against the capstan 16, and causes the tape withdrawing lever 64 to operate as a tape guide means at the position where the pin 65 is at a specified distance from the pinch roller 61, i.e., at the position determined by the cassette format.

Further the retraction of the reel chassis 4 in the direction of arrow in FIG. 15 drives the cam roller 72 along the cam groove 74 on the main chassis 1, thereby rotating the withdrawing lever 7 on the supply side counterclockwise in conformity with the configuration of the cam groove 74 to withdraw the tape from the cassette.

With the movement of the reel chassis 4 toward the cylinder device 14, the center of rotation (indicated at 8a in FIG. 6) of the subchassis drive lever 8 supported on the chassis 4 also shifts toward the cylinder device 14, so that the drive lever 8 is made rotatable clockwise since the contact lug 81 thereof is released from the main chassis 1. This makes the subchassis 5 retractable relative to the reel chassis 4. Nevertheless, since the front plate 51 of the subchassis 5 shown in FIG. 3 contacts the front side of the cassette 9, the subchassis 5 is not slidable relative to the reel chassis 4 and therefore moves with the reel chassis 4 to the position shown in FIG. 4.

When Reel Chassis is empty

The loading motor 26, when started up in the standby mode in FIG. 1C, starts to drive the reel chassis 4, which therefore moves toward the cylinder device 14 from position to position as illustrated in FIGS. 6 to 9.

This permits clockwise rotation of the subchassis drive lever 8, releasing the subchassis 5 from the reel chassis 4. Consequently, the subchassis 5 is retracted relative to the reel chassis 4 by the force of the spring 57 shown in FIG. 2A.

Figure 9:
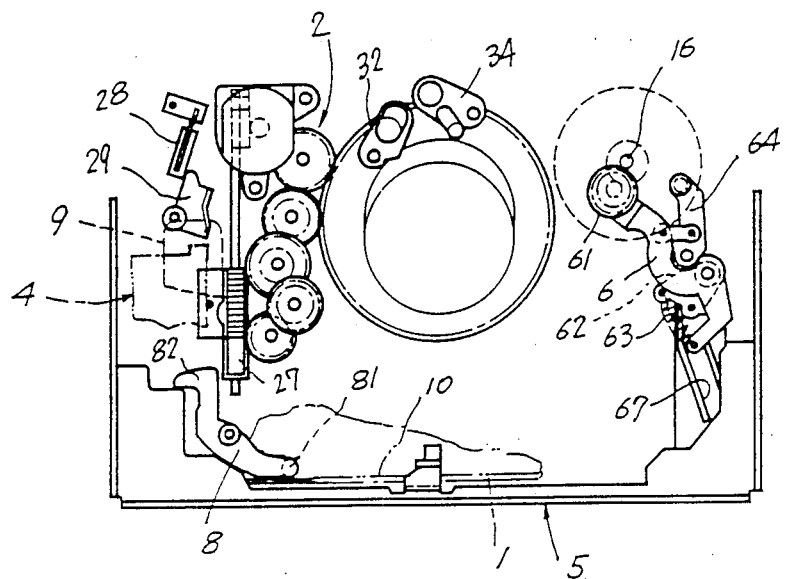
FIG. 9 is a plan view of the same in the play mode.

The reel chassis 4 and the subchassis 5 pass the second stop position of the play mode in FIG. 9 and further retract. The reel chassis 4 thereafter comes into contact with the switch lever 29 as shown in FIG. 10, whereupon the loading motor 26 stops to stop the reel chassis 4.

Figure 10:
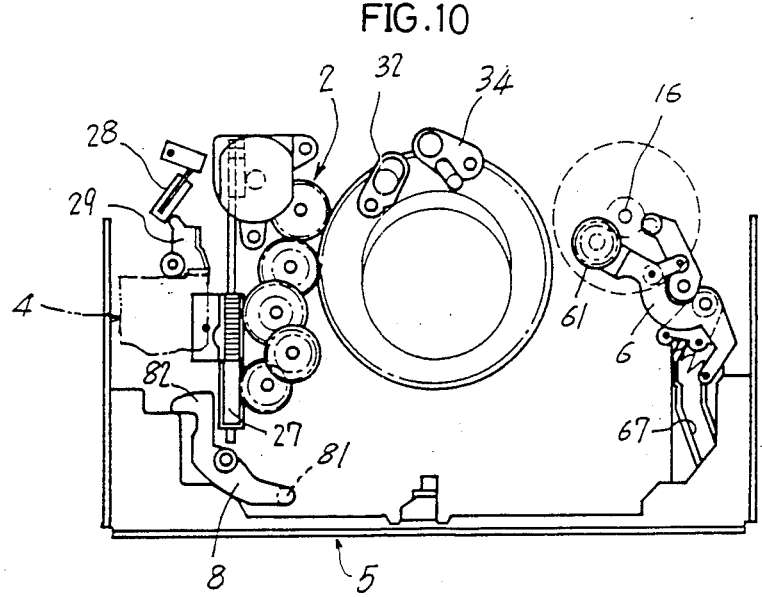
FIG. 10 is a plan view of the same in the empty mode.

During the change from the state of FIG. 9 to the state of FIG. 10, the pinch roller lever 6 slightly rotates counterclockwise as already stated, moving the pinch roller 61 slightly away from the capstan 16. Accordingly, the deformation of the pinch roller 61 due to the reaction of the capstan 16 can be precluded.

The change of the standby mode of FIGS. 1C, 3 and 6 to the empty mode of FIG. 1A, 5 and 10 retracts the reel chassis 4 by 20 mm and retracts the subchassis 5 relative to the reel chassis 4 by 16 mm. Thus, the depthwise length of the VTR is 36 mm smaller in the empty mode than in the standby mode.

Tape loading is completed upon the reel chassis 4 reaching the second stop position $S_2$ of the play mode. Even when the loading motor further rotates from this state to retract the reel chassis 4, the large circular-arc portion 21c of the first gear 21 of the loading device 2 is opposed to the small circular-arc portion 22c of the second gear 22 as already described, with the result that the torque of the loading motor 26 is not transmitted to the tape guides 32, 34, which in turn remain at rest in the loading completed position, causing no trouble to the retraction of the reel chassis 4.

When the ejection mode is selected in the empty mode by manipulating a switch (not shown) on the operation panel of the VTR, the loading motor 26 is reversely driven, first initiating the tape loading device into an unloading operation, which proceeds along with the subsequent advance of the reel chassis 4. Thus, the reel chassis 4 moves away from the cylinder device 14 and stops upon reaching the first stop position $S_1$ of the standby mode.

During the advance of the reel chassis 4, the contact lug 81 of the subchassis drive lever 8 comes into engagement with the front wall 10 of the main chassis 1, whereby the drive lever 8 is rotated counterclockwise. This causes the contact pawl 82 of the lever 8 to push the subchassis 5 forward against the spring 57, moving the subchassis 5 forward relative to the reel chassis 4 to return the chassis 5 to the standby position shown in FIGS. 3 and 6. In this state, the cassette holder 15 is unlocked and is raised.

According to the embodiment described above, the subchassis 5 provided between the main chassis 1 and the reel chassis 4 makes it possible to decrease the depthwise length of the VTR by an amount corresponding to the amount of retraction of the reel chassis 4 plus the amount of retraction of the subchassis 5.

(Second Embodiment)

Figure 16A:
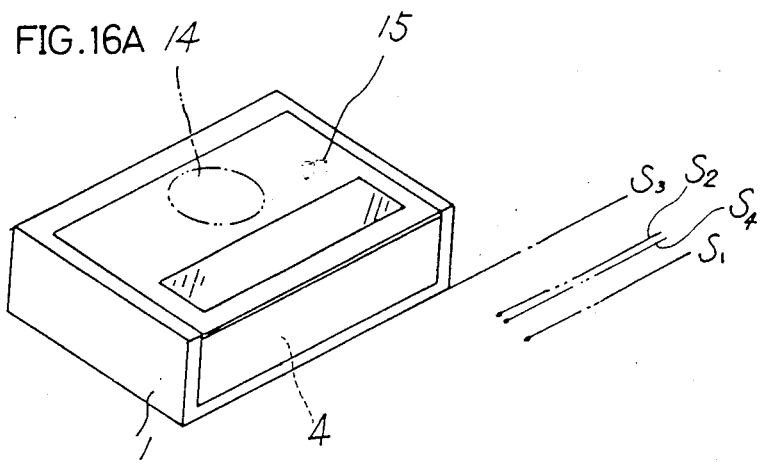
FIG. 16A is a perspective view showing another VTR, i.e. a second embodiment, in an empty mode.
Figure 16B:
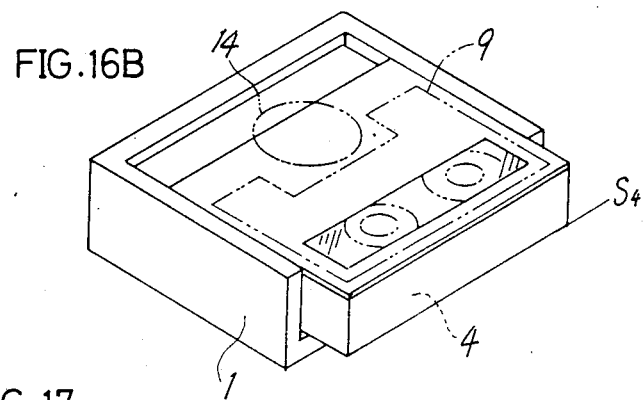
FIG. 16B is a perspective view of the same in a stop mode.

The VTR of this embodiment has a stop mode shown in FIG. 16B in addition to the ejection mode, standby mode, play mode and empty mode of the first embodiment. In the stop mode, the magnetic tape as wound around the cylinder device 14 is stopped during travel.

As seen in FIG. 16A, the reel chassis 4 can be stopped further at a fourth stop position $S_4$ of stop mode which is a specified distance away from the second stop position $S_2$ of the play mode toward the first position $S_1$ of the ejection mode.

When a stop button on the operation panel is manipulated in the play mode, an instruction for a change to the stop mode is given, whereby the loading motor is started, starting to retract the reel chassis 4. When the reel chassis 4 subsequently reaches the fourth stop position $S_4$, the loading motor is stopped to stop the reel chassis 4.

The reel chassis 4 can be stopped at the fourth stop position $S_4$, for example, in the following manner by the system controller for controlling the operation of the VTR.

The loading motor is started in response to the instruction signal given by the manipulation of the stop button. The controller detects when the switch 28 subsequently opens, and counts 100 msec from this time. Upon the lapse of this time interval, the loading motor is stopped to realize the stop mode.

Figure 17:
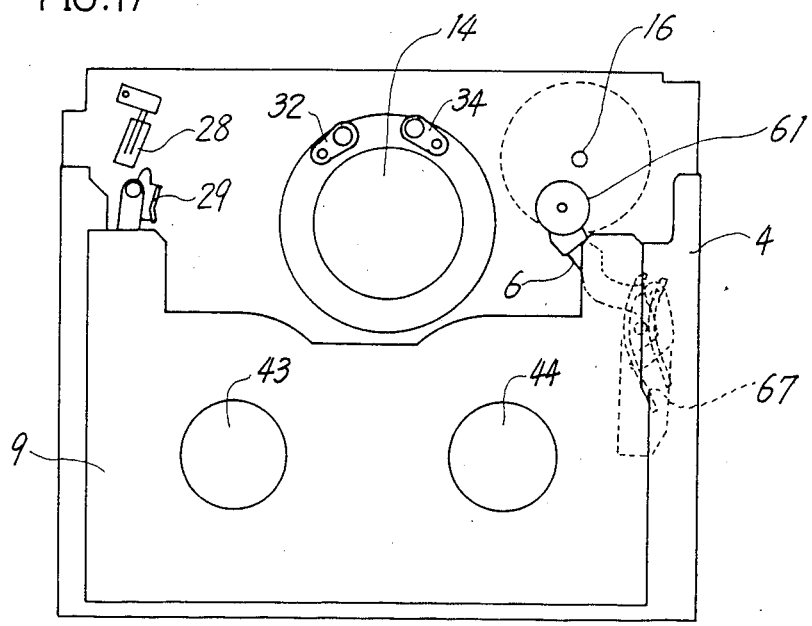
FIG. 17 is a plan view showing the interior of the VTR in the stop mode.

The above operation retracts the pivot of the pinch roller lever 6 shown in FIG. 17 along with the reel chassis 4 and moves the cam roller on the drive lever along the cam groove 67. Consequently, the pinch roller 61 in pressing contact with the capstan 16 in the play mode is moved away from the capstan.

Since the pinch roller is thus free of the reaction of the capstan, the pinch roller remains free of deformation even if the VTR is in the stop mode for a prolonged period of time.

(Third Embodiment)

FIGS. 18 to 21 show an embodiment wherein the reel chassis 4 is connected to the subchassis 5 by a lever mechanism in place of the spring 57 of FIG. 2A, whereby the subchassis 5 is made movable and positionable in place more reliably.

The reel chassis 4 has pivoted to the underside of its bottom plate 41 a first lever 80 located away from the front end of the bottom plate toward the cylinder device, and a second lever 85 close to the bottom plate end. These levers are each rotatable in a plane parallel to the bottom plate 41.

The first lever 80 has one free end 80a carrying a downwardly projecting pin 83 and the other free end 80b formed with a cutout groove 84.

The second lever 85 has one free end 86 carrying a downwardly projecting pin 87 slidably fitted in the cutout groove 84 of the first lever 80. The other free end 88 of the second lever 85 has a downwardly projecting pin 89 engaged with an engaging portion 58.

Accordingly, the first lever 80, when rotated in one direction, rotates the second lever 85 in the other direction. The free end 80a of the first lever 80 toward the cylinder device is shorter than the other free end 80b thereof. The free end 86, adjacent to the first lever 80, of the second lever 85 is shorter than the other free end 88 thereof. Consequently, the amount of rotation of the free end 88 of the second lever 85 toward the engaging portion 58 is greater than that of the free end 80a, toward the cylinder device, of the first lever 80.

The main chassis 1 is fixedly provided with a guide member 17 for the pin 82 on the first lever 80 to slidably engage in. The guide member 17 is formed with a first guide portion 118 in the form of a groove extending in the direction of movement of the reel chassis 4 and a second guide portion 119 extending from the inner end of the first guide portion 118 at a right angle therewith. The pin 83 on the first lever 80 is slidably fitted in the guide portion 118 or 119.

The engaging portion 58 is inwardly projected from the inner end of the subchassis 5 toward the cylinder device for the pin 89 on the second lever 85 to slidably engage in. The engaging portion 58 is formed with a guide groove 59 for the pin 89 to engage in. The groove 59 comprises a first portion 59a extending straight from the left end of the portion 58 rightward, a second portion 59b extending from the first portion 59a outwardly rightward, and a third portion 59c extending from the second portion 59b straight rightward.

The movement of the subchassis 5 will be described below in the case where the reel chassis 4 is loaded with a cassette 9 and also in the case where it is not loaded with the cassette 9.

With Cassette Loaded

Figure 18:
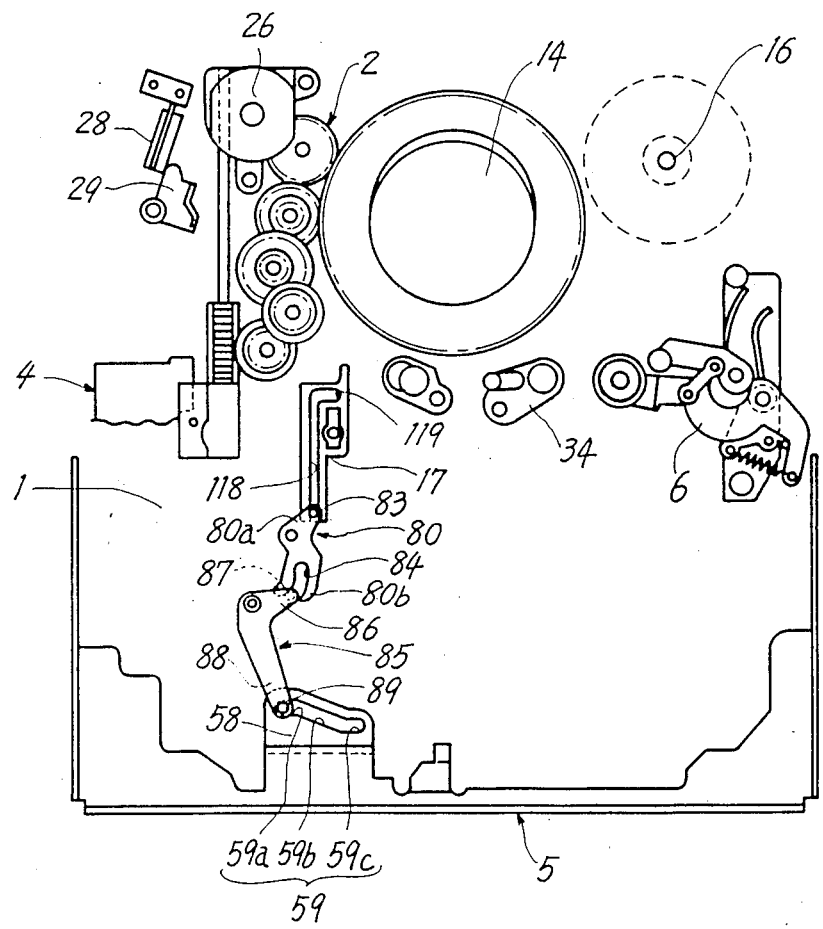
FIG. 18 is a plan view showing another VTR, i.e. a third embodiment, in a standby mode.
Figure 19:
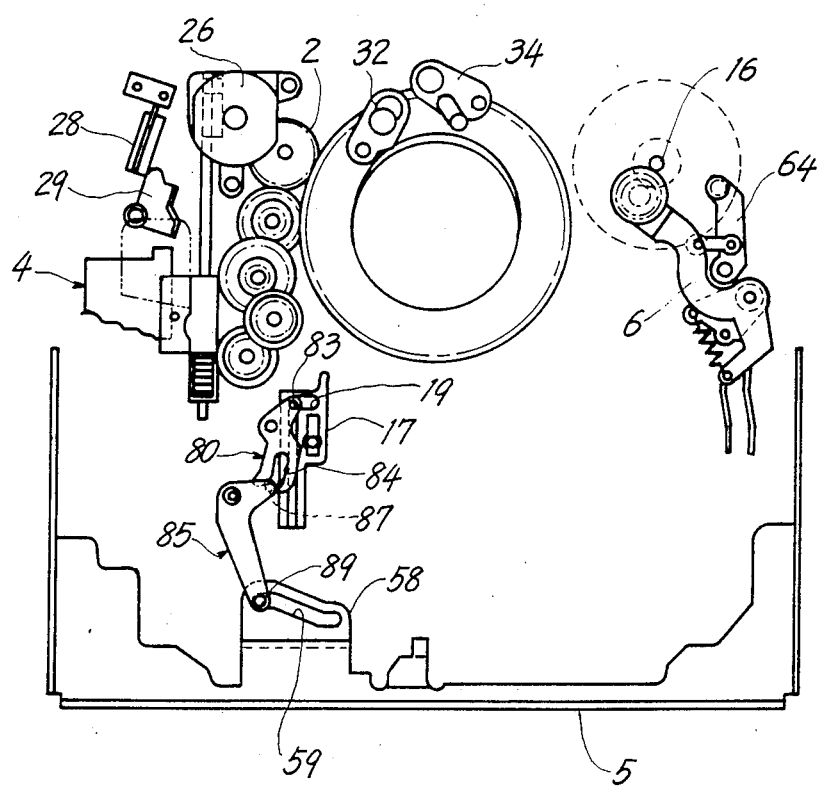
FIG. 19 is a plan view of the same in a play mode.

With reference to FIG. 18 showing the VTR in the standby mode and to FIG. 19 showing the same in the play mode, the movement of the reel chassis 4 toward the cylinder device 14 moves therewith the subchassis 5 in engagement with the second lever 85 on the subchassis 4.

At this time, the pin 83 on the first lever 80 is slidably in engagement with the first guide portion 18 on the main chassis 1 to prevent the rotation of the first lever 80, which in turn prevents the rotation of the second lever 85 in engagement with the first lever 80, permitting the subchassis 5 to move with the reel chassis 4 toward the cylinder device 14.

Upon the reel chassis 4 reaching the play mode position shown in FIG. 19, the switch 28 functions to stop the loading motor. The reel chassis 4 and the subchassis 5 therefore stop as the same time.

When Reel Chassis is Empty

During the change from the standby mode to the play mode, the reel chassis 4 and the subchassis 5 move together toward the cylinder device 14 as in the above case.

Even when the reel chassis 4 reaches the play mode position of FIG. 19, the loading motor 26 continues rotation since no cassette 9 is loaded. The reel chassis 4 and the subchassis 5 further retract until the motor stops upon the reel chassis 4 striking on the switch lever 19.

Figure 20:
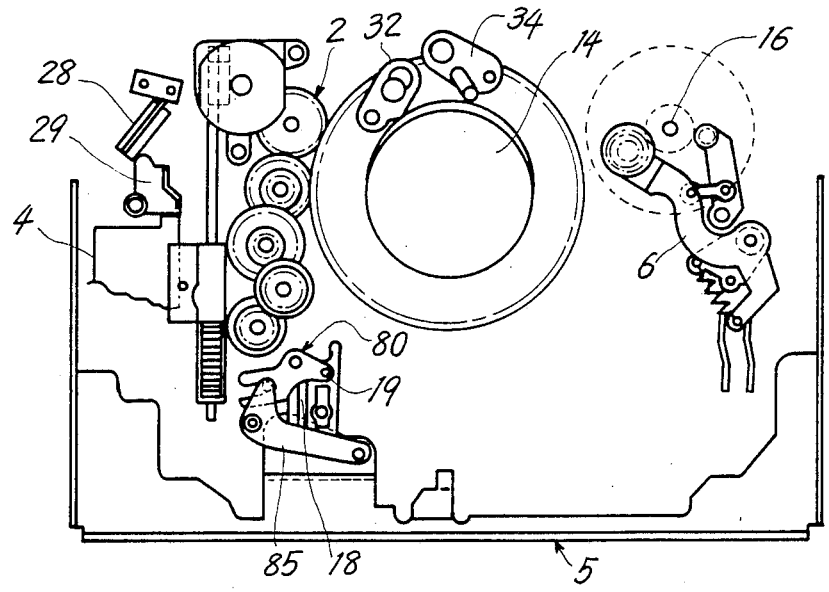
FIG. 20 is a plan view of the same in an empty mode.
Figure 21:
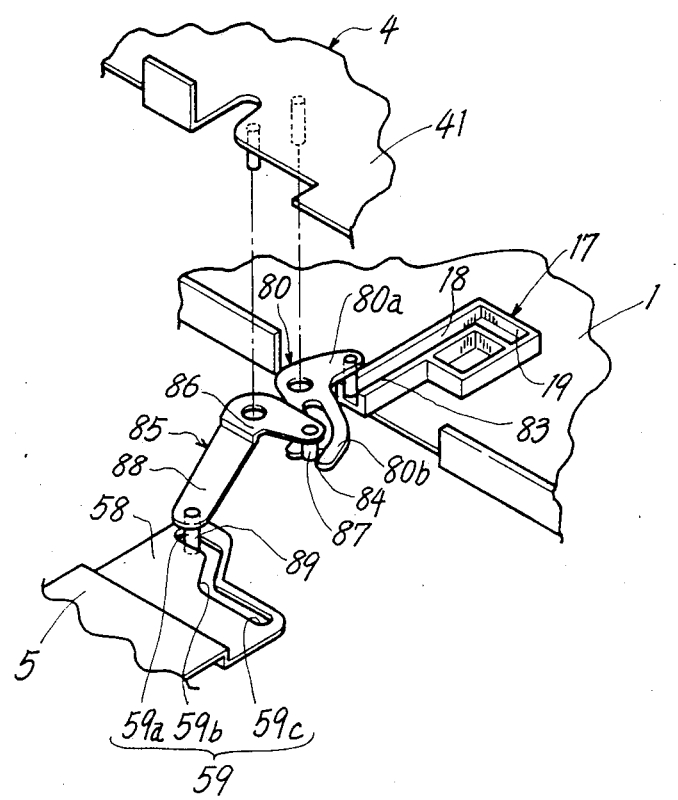
FIG. 21 is a perspective view showing a subchassis drive lever mechanism of the third embodiment.

When the reel chassis 4 passes the play mode position, pin 83 on the first lever 80 moves from the first guide portion 118 of the guide member 17 on the main chassis into the second guide portion 119 thereof, rotating the first lever 80 clockwise. This rotates the second lever 85 counterclockwise, moving the subchassis 5 toward the cylinder device 14 as seen in FIG. 20.

In this way, the subchassis 5 moves as arrested by the reel chassis 4 from the ejection mode position to the empty mode position and can therefore be accurately positioned in place in each mode.

The first lever 80 and the second lever 85 have such a ratio that the free end 88, adjacent the engaging portion 58, of the second lever 85 rotates by a greater amount than the free end 80a, adjacent the guide member 17, of the first lever 80, so that the subchassis 5 retracts by a greater amount than the reel chassis 4 for the change from the play mode to the empty mode. Accordingly, the present embodiment, like the first embodiment, can be greatly compacted in its entirety in the empty mode.

(Fourth Embodiment)

FIGS. 22 to 30 show a VTR which, like the VTRs of the foregoing embodiments, have four different modes, i.e., empty mode, play mode, standby mode and ejection mode, the mode being changeable according to the stopped position of the reel chassis 4 and the state of the cassette holder 15. However, the fourth embodiment differs from those already described in the construction of the tape loading device, chassis structure, etc. as will be described below.

With reference to FIGS. 22 to 25, the reel chassis 4 is slidably provided on the main chassis 1, but the subchassis described above is not provided.

The main chassis 1 is provided with a cylinder device 14 and, around the device 14, with a tape guide 38, second movable guide 39, fixed guide posts 101, 102, 103, etc. to constitute a tape loading device already known.

Disposed at the right side of the cylinder device 14 are a capstan 16 drivingly rotatable by a capstan motor, and a pinch roller lever 6 having a pinch roller 61 thereon as opposed to the capstan.

The main chassis 1 is provided at opposite sides of its rear end with a pair of platelike projecting stoppers 18, 19 with which the forward ends of tape withdrawing levers 7, 64 come into contact, respectively, in the empty mode.

The reel chassis 4 is greatly cut out at the portion thereof opposed to the cylinder device 14 so as not to collide with the device 14 when the reel chassis 4 retracts toward the device 14 and laps over the main chassis 1.

The reel chassis 4 carries thereon a supply reel support 43, a take-up reel support 44, a known idler 401 for driving the reel supports, a drive gear 402 meshing with the idler 401 for transmitting the torque of the capstan motor thereto, etc. The pair of withdrawing levers 7, 64 having tape withdrawing pins 71, 65, respectively, are pivoted to the reel chassis at opposite sides of its inner end. A pair of cassette positioning pins 405, 405 are provided in the vicinity of the levers 7, 64, respectively. A pair of cassette sensor switches 56, 56 are disposed at opposite side portions of the chassis 4 to the front of the reel supports 43, 44.

Figure 27:
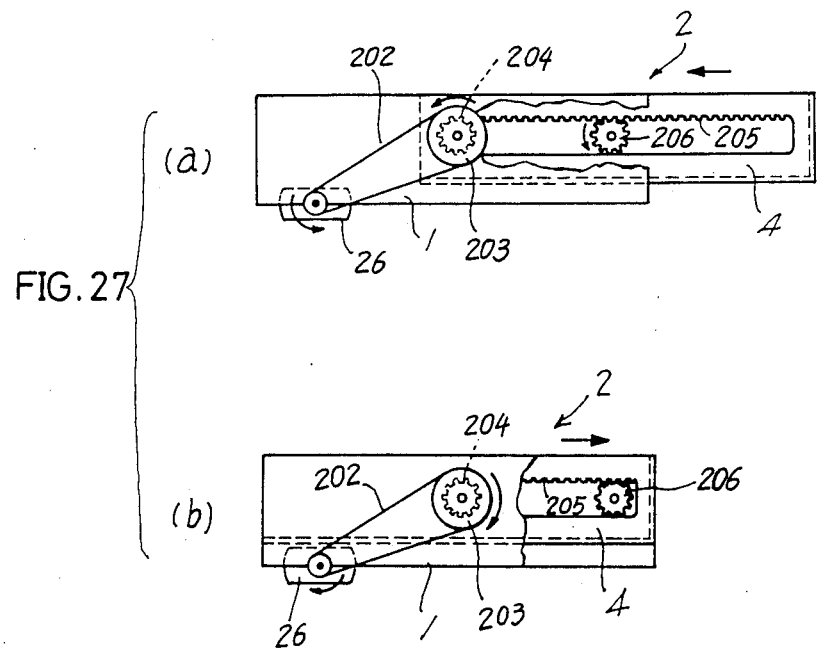
FIG. 27 is a side elevation showing a reel chassis drive mechanism in the fourth embodiment.

As seen in FIGS. 27 (a) and (b), the reel chassis 4 is driven by a loading motor 26 mounted on the main chassis 1. A drive gear 204 and a driven gear 206 are supported on the side plate of the main chassis 1. A pulley 203 is attached to and rotatable with the drive gear 204. The rotation of the loading motor 26 is transmitted to the pulley 203 through a belt 202 to drive the drive gear 204. The side plate of the reel chassis 4 has a rack 205 extending in the direction of sliding movement of the reel chassis. The drive gear 204 and the driven gear 206 are in mesh with the rack 205.

The loading motor 26 is started in the standby mode shown in FIG. 27 (a), initiating the drive gear 204 into counterclockwise rotation, whereupon the rack 205 is driven by the drive gear 204 to finally move the reel chassis 4 to the empty mode position shown in FIG. 27 (b). When the loading motor 26 reversely rotates, the drive gear is rotated clockwise to drive the reel chassis 4 toward the standby mode position of FIG. 27 (a).

To give a start instruction to the loading motor 26, the reel chassis 4 has a holder switch (not shown) for detecting that the cassette holder has been locked upon moving down onto the reel chassis from its raised position.

The loading motor 26 is controlled by the system controller of the VTR in the following manner.

First, the holder switch is checked as to whether it is on. When the switch is found to be on, the controller then checks whether both the cassette sensor switches 56, 56 are on. When at least one of the switches 56 is on, the reel chassis is transported to the play mode position, whereupon the chassis is stopped. If the cassette sensor switches are both off, the reel chassis is transported to the empty mode position, where it is halted. The loading motor is stopped by a signal from a limit switch (not shown) provided on the main chassis.

Accordingly, even if the cassette 9 is loaded in the holder 15 in an improper posture, at least one of the cassette sensor switches is turned on to stop the reel chassis 4 at the play mode position without advancing the chassis to the empty mode position. This eliminates the likelihood that the cassette in the holder 15 will collide with the cylinder device 14, hence safety.

The cassette sensor switches are not limited to two in number; at least three switches can be provided so that only when all the switches are off, the reel chassis is brought to the empty mode position.

With reference to FIGS. 28 and 29, the tape withdrawing levers 7, 64 are supported at their base ends respectively by pivots 78, 603 on the reel chassis 4, with L-shaped arms 77, 602 projecting from the respective lever base ends. The arms 77, 602 extend through arcuate slits 403, 404 in the reel chassis 4 into the space between the chassis 4 and the main chassis 1 and carry rollers 76, 601 at their forward ends. On the other hand, the main chassis 1 has arcuate contact pieces 75, 69 projecting therefrom for contact with the respective rollers 76, 601. Springs 79, 608 are connected between the chassis 4 and the lever 7 and between the chassis 4 and the lever 64, respectively, for biasing the levers 7, 64 away from each other.

Accordingly, with the movement of the reel chassis 4, the withdrawing levers 7, 64 are moved away from the contact pieces 75, 69, but the rollers 76, 601 are held in contact with the contact pieces 75, 69 by being biased with the springs 79, 608, whereby the two levers 7, 64 are rotated in directions away from each other.

Figure 30:
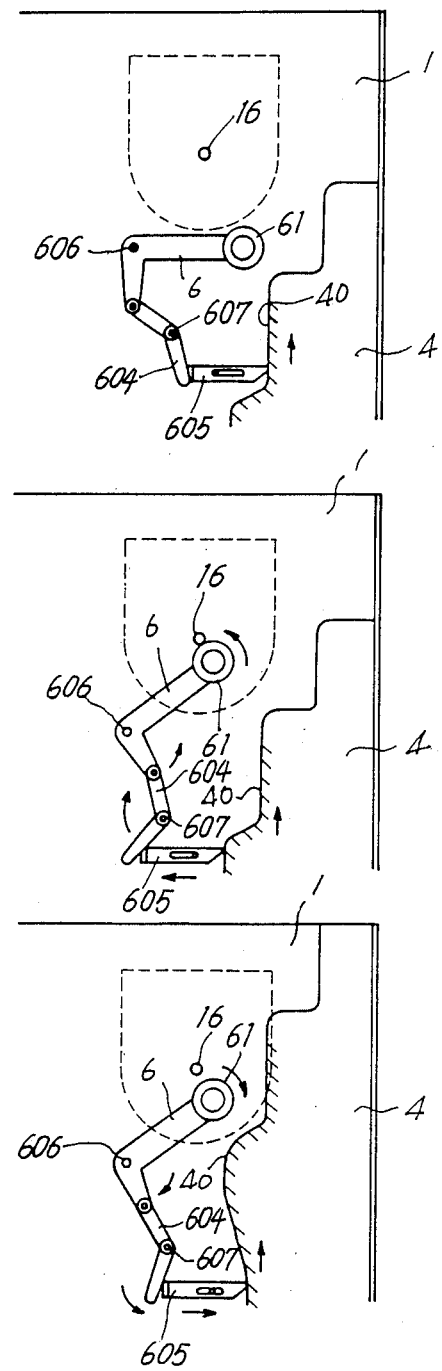
FIG. 30 is a plan view of a pinch roller pressing mechanism included in the fourth embodiment.

As shown in FIGS. 30 (a), (b) and (c), the pinch roller lever 6 is coupled to the reel chassis 4 by a pivotal lever 604 and a slide lever 605. The pinch roller lever 6 is L-shaped, supported at an intermediate portion thereof by a pivot 606 on the main chassis 1 and biased into clockwise rotation by an unillustrated spring. The pivotal lever 604 is supported at its midportion by a pivot 607 on the main chassis 1 and has two free ends, one of which is pivoted to the pinch roller lever 6. The other free end of the pivotal lever 604 is in sliding contact with the head of the slide lever 605, which is supported on the main chassis 1 reciprocatingly movably laterally over a specified distance. The forward end of the slide lever is in sliding contact with a cam face 40 formed on the reel chassis.

As illustrated, the cam face 40 varies in height along the direction of sliding movement of the reel chassis 4. The cam curve rises for a change from the ejection or standby mode of FIG. 30 (a) to the standby mode of FIG. 30 (b) and then gradually lowers as the mode further changes to the empty mode of FIG. 30 (c).

Consequently, the reel chassis 4, when moved in the direction of arrow shown, reciprocatingly drives the slide lever 605, and the movement of the lever is transmitted to the pinch roller lever 6 through the pivotal lever 604, with the result that the pinch roller lever 6 is rotated against the spring or by the action of the spring, thereby moving the pinch roller 61 into or out of pressing contact with the capstan 16.

The operation of the apparatus will be described below with changes in mode.

Figure 22:
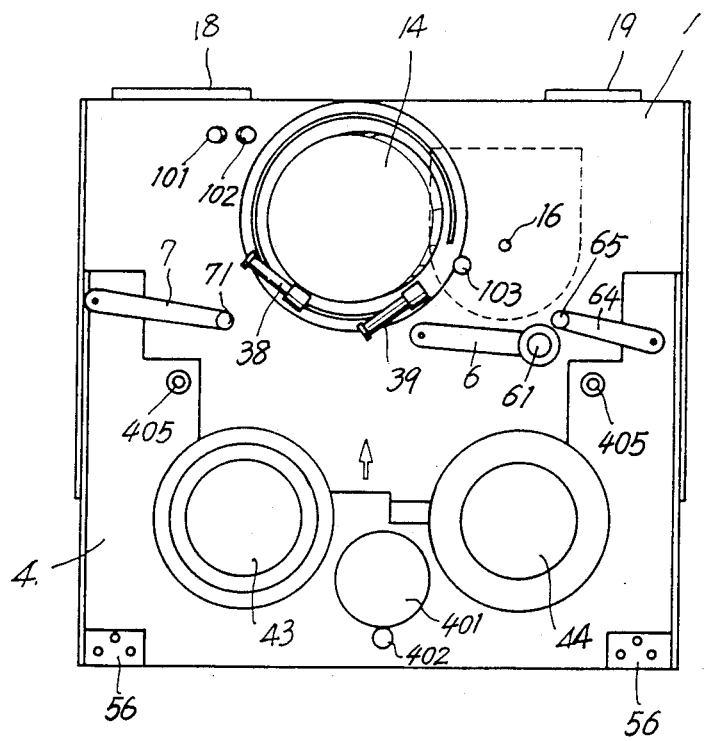
FIG. 22 is a plan view of another VTR, i.e. a fourth embodiment, in a standby mode.
Figure 23:
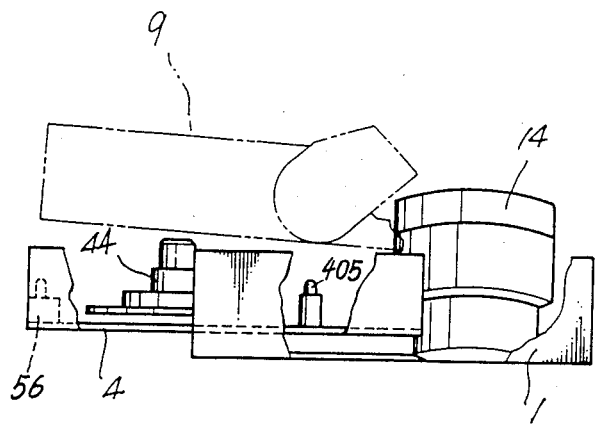
FIG. 23 is a right side elevation of the same.

In the ejection mode shown in FIG. 22, the tape withdrawing levers 7, 64 are positioned as rotated toward each other to the limit positions, holding the withdrawing pins 71, 65 most proximate to the respective reel supports 43, 44. The pinch roller lever 6 is positioned as rotated clockwise to its limit position, holding the pinch roller 61 at the greatest distance away from the capstan 16.

When a cassette 9 is inserted in the holder 15 positioned as seen in FIG. 1D, the holder 15 is lowered onto the reel chassis 4, whereupon the holder is locked to the chassis 4 by unillustrated lock means, whereby the apparatus is set in the standby mode of FIG. 1C. Further the holder 15, when lowered, turns on the pair of cassette sensor switches 56 shown in FIG. 22.

Figure 24:
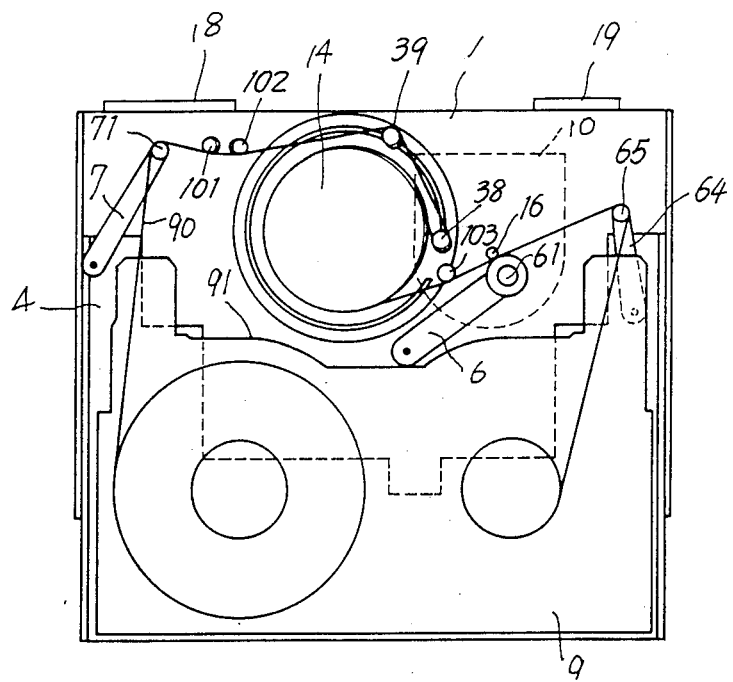
FIG. 24 is a plan view of the same in play mode.
Figure 25:
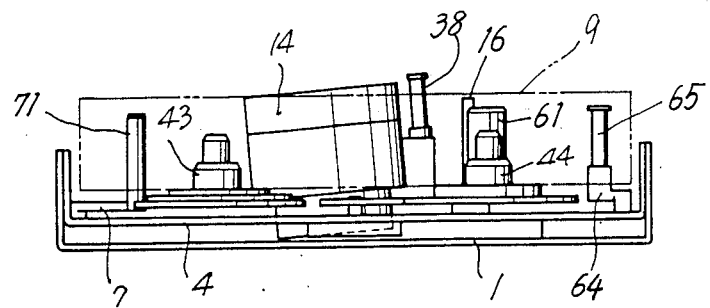
FIG. 25 is a front view of the same.

Consequently, the loading motor 26 is started, driving the reel chassis 4 to the play mode position of FIG. 24. With the movement of the reel chassis 4, the tape withdrawing levers 7, 64 rotate in directions away from each other, causing the tape withdrawing pins 71, 65 to withdraw a magnetic tape 90 from the cassette 9.

Simultaneously with this, the tape loading device operates to move the tape guide 38 and the second guide 39 clockwise around the cylinder device 14 and position the magnetic tape 90 in the specified tape drive path along the cylinder device 14, guide posts 101, 102, 103 and capstan 16.

Further with the movement of the reel chassis 4, the pinch roller lever 6 is driven counterclockwise to cause the pinch roller 61 to press the tape 90 against the capstan 16.

Completion of signal recording or reproduction in the play mode is followed by a change to the ejection mode of FIG. 1D, in which the cassette 9 is removed from the holder 15.

Subsequently, the empty holder 15 is lowered and locked to the reel chassis 4. Since no cassette is loaded in the holder 15 at this time, both the cassette sensor switches 56 remain inoperative. Consequently, the reel chassis 4 is driven to the empty mode position of FIG. 26 as already described.

The shift of the reel chassis 4 from the ejection mode position of FIG. 22 to the empty mode position of FIG. 26 rotates the tape withdrawing levers 7, 64 in the following manner.

When the ejection mode of FIG. 22 changes to the play mode of FIG. 24, the levers 7, 64 rotate away from each other.

Figure 26:
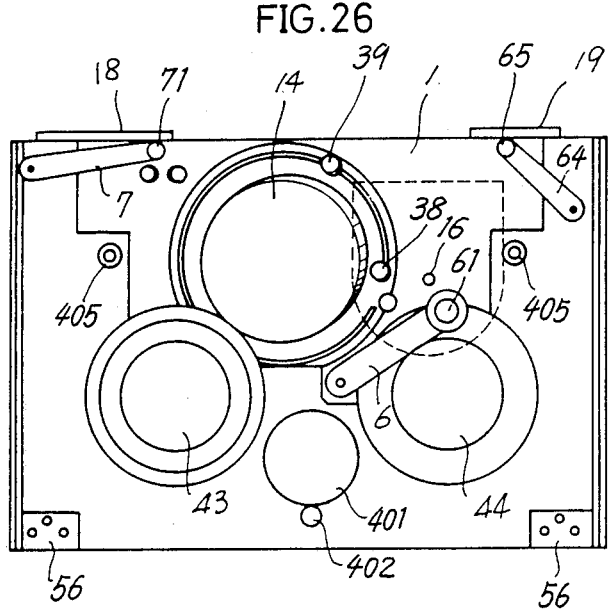
FIG. 26 is a plan view of the same in an empty mode.

While the reel chassis 4 further advances to the empty mode position of FIG. 26, the forward ends of the withdrawing levers 7, 64 come into contact with the stoppers 18, 19 on the main chassis 1, which in turn prevent further rotation of the levers 7, 64 in directions away from each other. At this time, the springs 79, 608 stretch to permit the movement of the reel chassis 4. Accordingly, in the empty mode wherein the reel chassis 4 is completely superposed on the main chassis 1, there is no likelihood that the levers 7, 64 will project beyond the extent of the main chassis 1.

With the apparatus described above, the pinch roller 61 is released from the capstan 16 in the empty mode of FIG. 26, so that the duration during which the pinch roller is pressed against the capstan at rest is minimized, thus obviating the likelihood that the pinch roller 61 will be deformed by the reaction exerted by the capstan 16. Further because the pinch roller lever 6 and the capstan 16 are supported commonly by the main chassis 1, the pinch roller 61 can be set in parallel to the capstan 16 with high accuracy (Fifth Embodiment)

Figure 31:
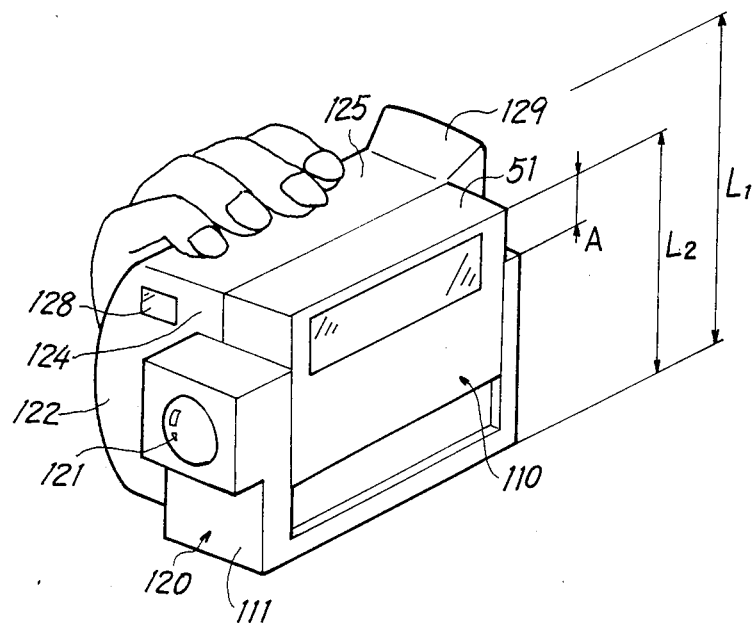
FIG. 31 is a perspective view showing a camera-equipped VTR as a fifth embodiment in a tape drive mode.
Figure 32:
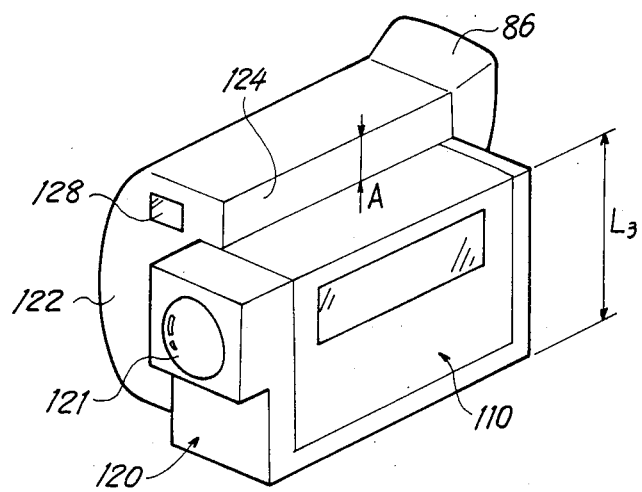
FIG. 32 is a perspective view showing the same in an empty mode.
Figure 33:
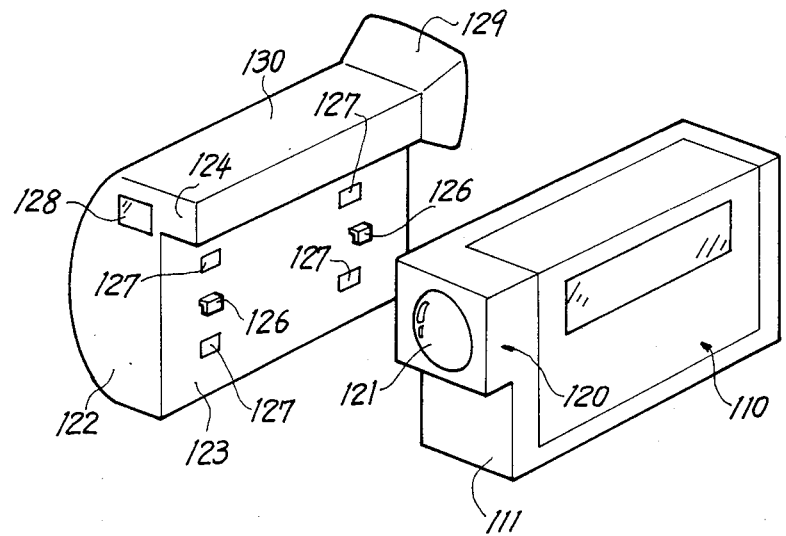
FIG. 33 is an exploded perspective view of the same.

FIGS. 31 to 33 show a camera-equipped VTR embodying the present invention.

This VTR comprises a VTR unit 110 and a camera unit 120 which are housed in a single cabinet 111. As is already known, the camera unit 120 comprises an objective lens 121, autofocusing mechanism, zooming mechanism, automatic iris diaphragm mechanism, solidstate image sensor, etc.

The VTR unit 110 comprises, for example, the construction of 8-mm VTR according to any one of the foregoing embodiments. The main chassis is fixedly provided in the cabinet 111. The reel chassis and subchassis (hereinafter referred to collectively as a "slide chassis") are vertically slidably provided relative to the main chassis. A grip 122 of resin is removably attached to one side of the cabinet 111. FIG. 31 shows the VTR unit 110 in tape drive mode for photographing, and FIG. 32 shows the VTR unit in empty mode.

With reference to FIG. 33, the grip 122 has a side face 123 provided with a pair of hooks 126. The grip 122 can be joined to the cabinet 111 by engaging the hooks 126 in sockets (not shown) formed in the side face of the cabinet 111 opposed to the grip.

The grip 122 has a battery pack incorporated therein and further has an optical viewfinder 130 including an objective lens 128. An eyecup 129 is attached to the viewfinder 130. Power is supplied from the battery pack to the camera unit 120 and to the VTR unit 110 by the contact of contact pieces 127 on the side face 123 of the grip 122 with contact pieces (not shown) provided on the side face of the cabinet 111.

In the empty mode of FIG. 32, the VTR unit 110 has a minimum depthwise length $L_3$. The grip 122 has a head portion 124 projecting beyond the VTR unit 110 by a length of A.

When a cassette is to be loaded into the VTR unit 110, the slide chassis of the VTR unit 110 is projected from the main chassis to the greatest extent, increasing the depthwise length of the VTR unit 110 to $L_1$. With the cassette loaded, the unit 110 is set in standby mode.

The slide chassis is thereafter moved by depressing a button on an operation panel, whereby the depthwise length of the VTR unit 110 is set to $L_2$ as seen in FIG. 31, whereby the VTR unit 110 is set in the tape drive mode ready to record or reproduce images.

In the tape drive mode, the VTR unit 110 is projected from the camera unit 120 by a length equal to the length of projection, A, of the grip 122, with the result that the front plate 51 of the subchassis of the VTR unit 110 becomes flush with the top surface 125 of the grip 122.

Accordingly, when the VTR is in the state for photographing shown in FIG. 31, the side face, opposed to the grip, of the VTR unit 110 is entirely covered with the grip 122, so that the interior of the VTR unit 110 is not accessible, for example, by the finger tip of the hand holding the grip. The mechanism of the VTR unit 110 can therefore be protected.

(Sixth Embodiment)

Figure 34:
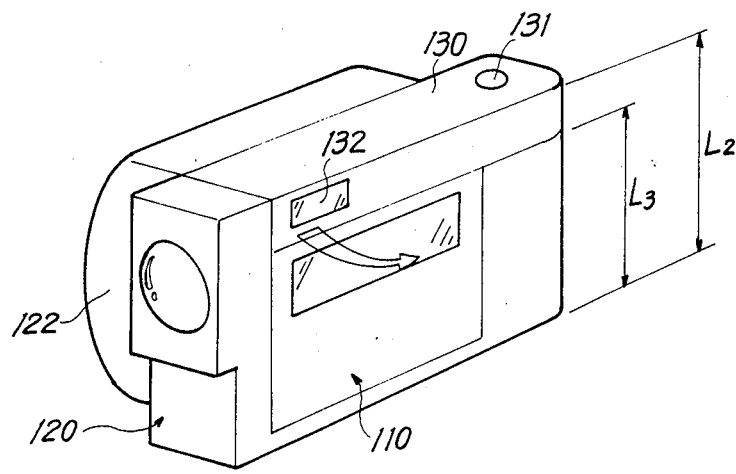
FIG. 34 is a perspective view of a cameraequipped VTR as a sixth embodiment in an empty mode.
Figure 35:
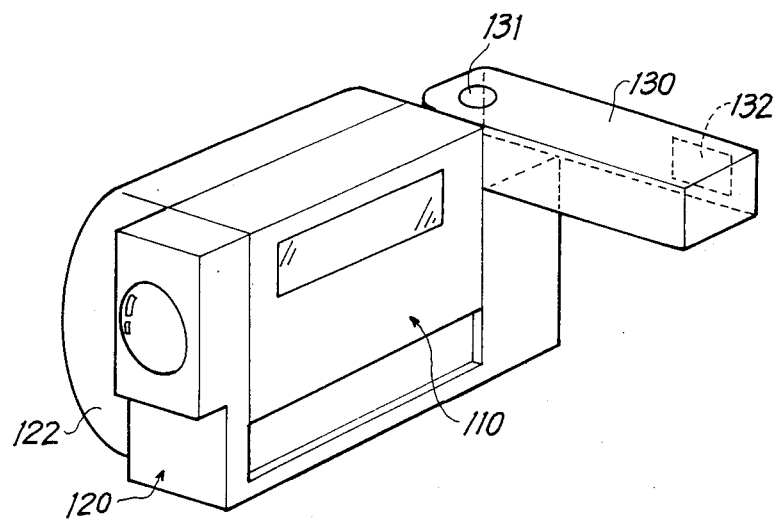
FIG. 35 is a perspective view showing the same in a tape drive mode.

FIGS. 34 and 35 show another camera-equipped VTR embodying the present invention.

A grip 122 has a battery pack only incorporated therein. An electronic viewfinder 130 is supported by a pivot 131 on the rear portion of a camera unit 120 and is rotatable through 90 degrees for the user to monitor through an eyepiece portion 132 the image to be photographed.

In the empty mode shown in FIG. 34, the viewfinder 130 can be accommodated in a space created by a reduction in the size of a VTR unit 110. The viewfinder has a thickness of $L_2-L_3$, with the result that in the empty mode, the top surface of the viewfinder 130 is flush with the top surface of the grip 122.

FIG. 35 shows the VTR in tape drive mode, in which the VTR unit 110 is enlarged utilizing the space produced by the rotation of the viewfinder 130.

(Seventh Embodiment)

Figure 36:
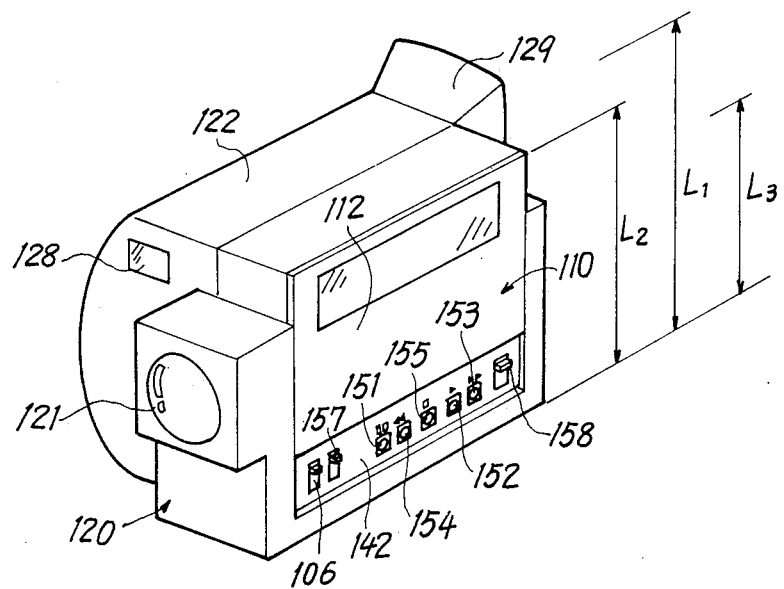
FIG. 36 is a perspective view of a cameraequipped VTR as a seventh embodiment in a tape drive mode.
Figure 37:
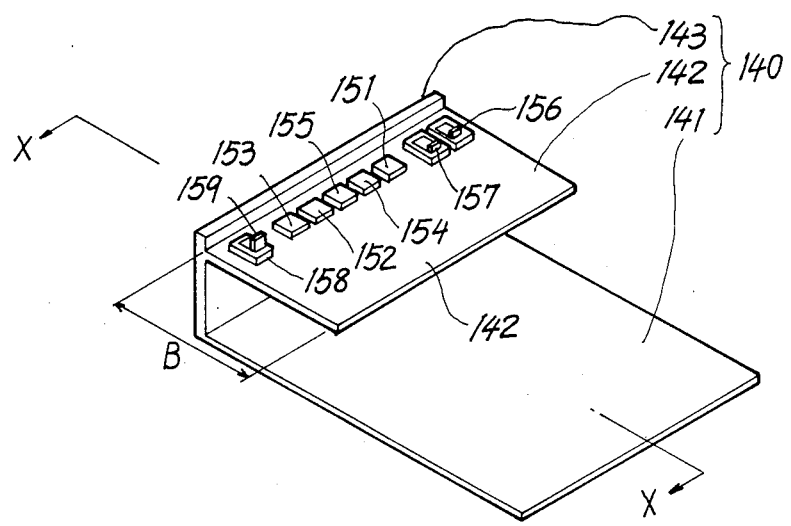
FIG. 37 is a perspective view showing a VTR accommodating portion included in the seventh embodiment.
Figure 38:
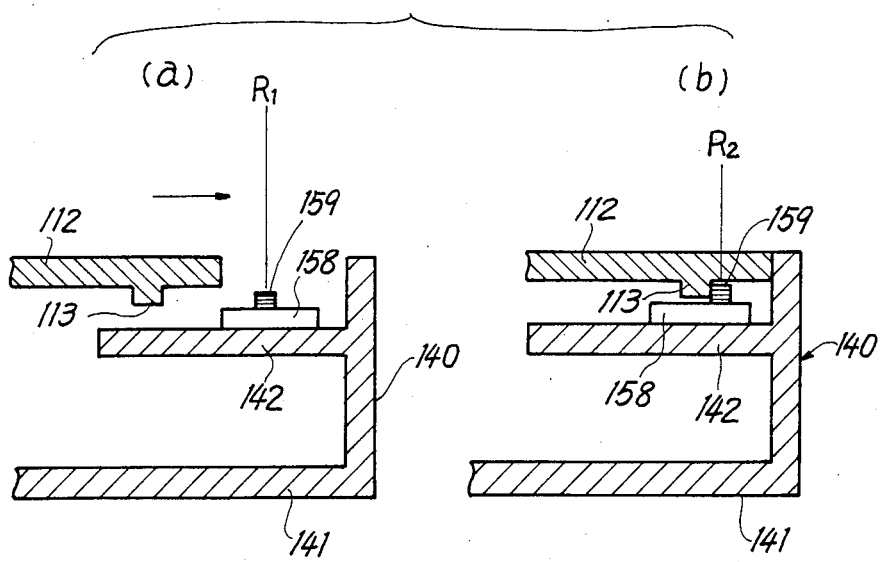
FIG. 38 is a view in section taken along the line X-X in FIG. 37.
Figure 39A:
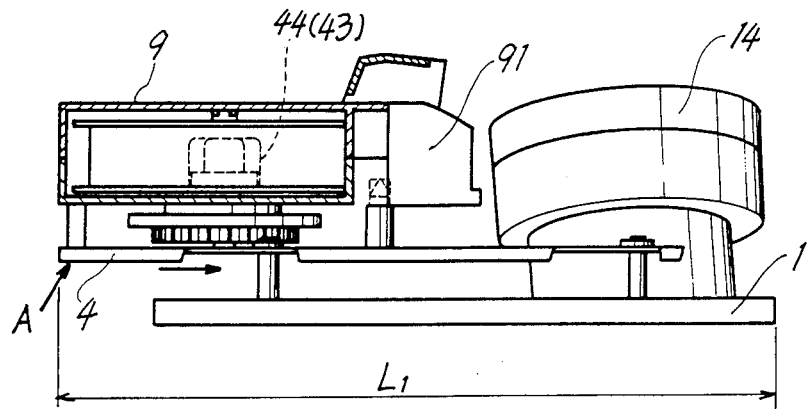
FIG. 39A is a sectional view showing a conventional VTR in a standby mode.
Figure 39B:
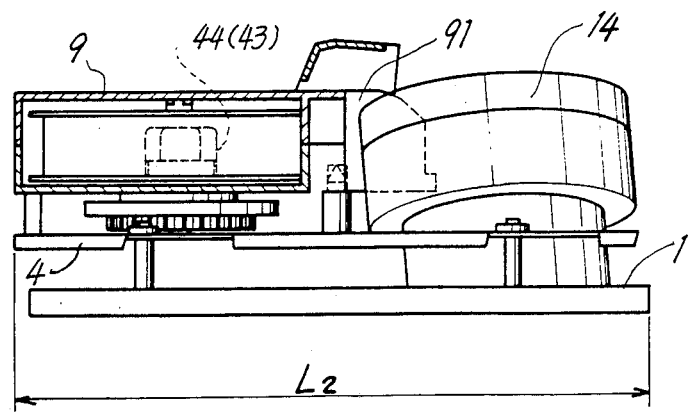
FIG. 39B is a sectional view showing the same in a play mode.

FIGS. 36 to 38 show another camera-equipped VTR embodying the present invention.

The cassette holder of a VTR unit 110 is fixedly provided over its upper side with a top plate 112 serving as a cover for the VTR unit as will be described below.

The cabinet for housing the VTR unit 110 and a camera unit 120 has a VTR accommodating portion 140 as shown in FIG. 37. This portion 140 comprises a rear panel 141 opposed to a grip 122, a bottom panel 143 having a width approximately equal to the thickness of the VTR unit 110, and a front panel 142 having a length B greater than the maximum amount of projection, $L_1-L_3$, of the VTR unit 110.

Provided on the front panel 142 are buttons, such as REC button 151, PLAY button 152, FF (fast-forward) button 153, REW (rewind) button 154 and pause button 155, which are required only in tape drive mode, switches, such as variable speed shutter switch 156 and white balance switch 157, which are required only during photographing, and a slide power switch 158 for supplying power to the tape drive system and the like of the VTR unit.

FIG. 36 shows the VTR in play mode, in which the VTR unit 110 is enlarged with the slide chassis projected from the main chassis. In this mode, the buttons and switches are exposed and can therefore be manipulated.

The top plate 112 of the cassette holder is provided on its underside with a projection 113 opposed to the cabinet front panel 142 as seen in FIGS. 38 (a) and (b). The projection 113 is so positioned as to be engageable with the slide knob 159 of the power switch 158 with the movement of the top plate 112.

In the tape drive mode shown in FIG. 38 (a), the projection 113 is away from the power switch 158, which is left exposed for manipulation as stated above. In this state, the knob 159 of the power switch 158 is manually slid leftward to on-position $R_1$ as illustrated, whereby power is supplied.

When the tape drive mode is to be changed to the empty mode, the VTR unit is temporarily brought into ejection mode for the removal of the cassette. Subsequently in response to an instruction for the change to the empty mode, the slide chassis is retracted. With this movement, the top plate 112 of the cassette holder is moved in the direction of arrow shown in FIG. 38 (a). Consequently, the knob 159 of the power switch 158 is pushed rightward to off-position $R_2$ by the projection 113 as shown in FIG. 38 (b) to discontinue the supply of power.

With the camera-equipped VTR described above, the VTR unit 110 has its mechanisms such as the cylinder device still covered with the front panel 142 without exposure even when brought into the standby mode or ejection mode with the slide chassis projected from the main chassis to the greatest extent.

Since the switches and the like are covered with the top plate 112 of the cassette holder in the empty mode, such switches remain free of erroneous operation when the VTR is carried as placed in a bag or the like. Further even if the user forgets to turn off the power switch after photographing, no trouble occurs because the change to the empty mode automatically turns off the power supply as stated above.

The present apparatus is not limited to the foregoing embodiments in construction but can be modified variously by one skilled in the art without departing from the scope of the invention as defined in the appended claims.

What is claimed is:

1. A signal recording-reproducing apparatus for use with a cassette comprising:

a main chassis having thereon a cylinder device with a rotary head;

a reel chassis having a supply reel support and a takeup reel support thereon, said reel chassis is slidably provided on said main chassis and reciprocatingly movably disposed on the main chassis, said reel chassis is shaped to be accommodated inside the main chassis when moved to a position where the reel chassis is in an empty mode position;

a subchassis, for accommodating the cassette loaded on the reel chassis, said subchassis is provided on the main chassis and is slidable along the direction of movement of the reel chassis, the subchassis projecting from the reel chassis in a standby mode position to a position permitting loading of the cassette, the subchassis movable with the reel chassis when the reel chassis moves from the standby mode position to an empty mode position, the subchassis accommodated inside the reel chassis in the empty mode position;

movement guide means, provided on the main chassis and connected to the reel chassis, for moving the reel chassis
   (i) to the standby mode position where the reel chassis is projected from the main chassis and projects away from the cylinder device,
   (ii) to the play mode position where the reel chassis is positioned closer to the cylinder device than in the standby mode position, and
   (iii) the empty mode position where the reel chassis is positioned closer to the cylinder device than in the play mode position; and positioning means for placing the reel chassis in position for the standby mode position, the play mode position and the empty mode position, the cassette is loaded on the reel supports when the reel chassis is placed in the standby mode position, the cassette is positioned for recording or reproducing signals when the reel chassis is placed in the play mode position, the assembly of the main chassis and the reel chassis having an overall length, measured along the direction of movement of the reel chassis, which is shortest when the reel chassis is placed in the empty mode position which is shorter than when the reel chassis is in the standby and play mode positions.

2. An apparatus as defined in claim 1 wherein the movement guide means comprises a pair of guide bars provided on respective side portions of the main chassis, and a pair of guide members provided on respective side portions of the reel chassis and slidably in engagement with respective guide bars.

3. An apparatus as defined in claim 1 wherein a reel chassis drive mechanism is provided on the main chassis for reciprocatingly driving the reel chassis between the standby mode position and the empty mode position with a loading motor.

4. An apparatus as defined in claim 3 wherein the main chassis is provided with a tape loading device for withdrawing a magnetic tape from the cassette as loaded on the reel chassis and winding the tape around the cylinder device, and an intermittent rotary motion mechanism is provided between the loading motor and the tape loading device for transmitting torque of the loading motor to the tape loading device only when the reel chassis moves between the standby mode position and the play mode position.

5. An apparatus as defined in claim 3 wherein the positioning means has a mode sensor switch mounted on the main chassis and so positioned that (a) the cassette on the reel chassis comes into contact with the mode sensor switch upon the reel chassis reaching the play mode position and (b) the reel chassis comes into contact with the mode sensor switch upon reaching the empty mode position when no cassette is loaded, the mode sensor switch connected to a control circuit for the loading motor.

6. An apparatus as defined in claim 1 wherein the subchassis is biased toward the reel chassis by a spring means, and a drive lever is pivoted to the reel chassis and has one end engageable with the subchassis and the other end engageable with the main chassis for limiting a position of the subchassis according to a position of the reel chassis relative to the main chassis.

7. An apparatus as defined in claim 1 wherein the reel chassis is provided with a first lever and a second lever each rotatable in a plane parallel to a direction of sliding movement of the reel chassis and each having two free ends, one of the free ends of the first lever and one of the free ends of the second lever in engagement with each other rotatably in directions opposite to each other, the other free end of the first lever slidably in engagement with a guide member provided on the main chassis, the other free end of the second lever slidably in engagement with an engaging portion provided on the subchassis, the guide member having a first guide portion extending along a direction of movement of the reel chassis and a second guide portion extending from and bent at an inner end of the first guide portion, the first lever and the second lever being in a ratio making said other free end of the second lever rotatable by a greater amount than said other free end of the first lever.

8. An apparatus as defined in claim 1 wherein a pinch roller lever carrying a pinch roller thereon is pivoted to the reel chassis, and a cam mechanism is provided between the pinch roller lever and the main chassis, the cam mechanism having a cam face for pressing the pinch roller against a capstan with a change from the standby mode to the play mode and for moving the pinch roller away from the capstan with a change from the play mode to the empty mode.

9. An apparatus as defined in claim 8 wherein the reel chassis further has a stop mode position which is a position located between the play mode position and standby mode position, and the cam face of the cam mechanism is so shaped as to move the pinch roller slightly away from the capstan with the movement of the reel chassis from the play mode position to the stop mode position.

10. An apparatus as defined in claim 1 wherein the reel chassis has pivoted thereto two tape withdrawing levers rotatable with the movement of the reel chassis relative to the main chassis, and the main chassis is provided at an inner portion with stoppers for end portions of the respective withdrawing levers to come into contact in the empty mode position.

11. A signal recording-reproducing apparatus comprising:
a main chassis with a cam face, said main chassis having thereon
a cylinder device with a rotary head, and
a capstan for driving a magnetic tape;
a reel chassis slidably provided on the main chassis and carrying a supply reel support and a take-up reel support thereon, the reel chassis moveable to a standby mode position for loading a cassette thereon and movable to a play mode position to record or reproduce signals, the reel chassis having a pivot,
a pinch roller lever rotatably supported on the pivot, the pinch roller lever provided with a pinch roller,
a drive lever provided with a cam follower,
a spring means for connecting together the pinch roller lever and the drive lever so as to rotate the pinch roller lever and drive lever in a same direction, the cam follower in engagement with the cam face provided on the main chassis, the drive lever and the pinch roller lever are rotatable while elastically deforming the spring means with movement of the reel chassis from the standby mode position to the play mode position to press the pinch roller against the capstan with an elastic force of the spring means; and
a subchassis, for accommodating the cassette loaded on the reel chassis, said subchassis is provided on the main chassis and is slidable along a direction of movement of the reel chassis, the subchassis projecting from the reel chassis in the standby mode position to a position permitting loading of the cassette, the subchassis movable with the reel chassis when the reel chassis moves from the standby mode position to an empty mode position, the subchassis accommodated inside the reel chassis in the empty mode position.

12. An apparatus as defined in claim 11 wherein a tape withdrawing lever carrying a tape withdrawing pin thereon is supported on the reel chassis by a pivot at a distance from the pivot for the pinch roller lever, the pinch roller lever and the tape withdrawing lever connected to each other by a link plate and pivotally movable in a same direction.

13. A signal recording-reproducing apparatus comprising:
a main chassis having thereon a cylinder device with a rotary head;
a reel chassis slidably provided on the main chassis and carrying a supply reel support and a take-up reel support thereon, the reel chassis positionable at a standby mode position for loading a cassette thereon and positionable at a play mode position to record or reproduce signals, the reel chassis having a pair of tape withdrawing levers supported thereon rotatably in a plane along a length of the reel chassis, a pair of tape withdrawing pins, the tape withdrawing pins located opposed to the respective reel supports, and a cam mechanism provided between the main chassis and each of the tape withdrawing levers, said cam mechanism having a cam face for rotating the tape withdrawing pin in a tape withdrawing direction with a change from the standby mode position to the play mode position; and a subchassis, for accommodating the cassette loaded on the reel chassis, said subchassis is provided on the main chassis and is slidable along a direction of movement of the reel chassis, the subchassis projecting from the reel chassis in the standby mode position to a position permitting loading of the cassette, the subchassis movable with the reel chassis when the reel chassis moves from the standby mode position to an empty mode position, the subchassis accommodated inside the reel chassis in the empty mode position.

14. A signal recording-reproducing apparatus for use with a cassette comprising:

a main chassis having mounted thereon a cylinder device with a rotary head and having an operation panel;

a slide chassis loadable with the cassette and provided on the main chassis movably toward or away from the cylinder device;

movement guide means, provided on the main chassis and connected to the slide chassis, for moving the slide chassis to a tape drive mode position where the slide chassis is projected from the main chassis away from the cylinder device and for moving the slide chassis to an empty mode position where the slide chassis is positioned closer to the cylinder device than in the tape drive mode position;

positioning means for placing the slide chassis in position for the tape drive mode position and for the empty mode position; and a cover, provided on the slide chassis, for covering the operation panel on the main chassis, when the cassette is loaded on the slide chassis in position for recording or reproducing signals, the operation panel is exposed by movement of the cover when the slide chassis is in the tape drive mode position, and the operation panel is covered with the cover by sliding movement of the slide chassis to the empty mode position when no cassette is loaded on the slide chassis.

15. An apparatus as defined in claim 14 wherein the operation panel is provided with a power switch changeable from an on-position to an off-position by engagement with the cover when the tape drive mode changes to the empty mode position.

* * * * *